(12) United States Patent
Geelen

(10) Patent No.: US 9,418,550 B2
(45) Date of Patent: *Aug. 16, 2016

(54) NAVIGATION APPARATUS, SERVER APPARATUS AND METHOD OF COLLECTING PARKING LOCATION INFORMATION

(71) Applicant: TomTom International B.V., Amsterdam (NL)

(72) Inventor: Pieter Geelen, Amsterdam (NL)

(73) Assignee: TomTom International B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/520,454

(22) Filed: Oct. 22, 2014

(65) Prior Publication Data

US 2015/0051833 A1 Feb. 19, 2015

Related U.S. Application Data

(63) Continuation of application No. 13/202,115, filed as application No. PCT/EP2009/050378 on Jan. 14, 2009, now Pat. No. 8,890,715.

(51) Int. Cl.
*G08G 1/14* (2006.01)
*G01C 21/32* (2006.01)
*G01C 21/36* (2006.01)

(52) U.S. Cl.
CPC *G08G 1/14* (2013.01); *G01C 21/32* (2013.01); *G01C 21/3685* (2013.01)

(58) Field of Classification Search
CPC ....... G01C 21/32; G01C 21/3685; G08G 1/14
USPC ........... 340/932.2, 935, 426.19, 825.49, 938, 340/902, 908, 972, 990–994, 995.1, 995.13, 340/995.17, 426.22
See application file for complete search history.

(56) References Cited

U.S. PATENT DOCUMENTS

| 5,166,680 A | 11/1992 | Ganot |
| 6,266,609 B1 | 7/2001 | Fastenrath |

(Continued)

FOREIGN PATENT DOCUMENTS

| FR | 2909477 A1 | 6/2008 |
| JP | 2000194994 A | 7/2000 |

(Continued)

OTHER PUBLICATIONS

International Search Report issued Nov. 3, 2009 for International Application No. PCT/EP2009/057879.

(Continued)

*Primary Examiner* — Daniel Previl

(57) ABSTRACT

A navigation apparatus comprises a processing resource operably coupled to a receiver for location-related data and arranged to perform, when in use, location determination. The processing resource supports a parking location determination module the parking location determination module is arranged to determine when the location determined is substantially unchanged and to determine that the location determined constitutes a candidate parking location in response to the location determined remaining substantially unchanged relative to a predetermined period of time.

20 Claims, 17 Drawing Sheets

(56) References Cited

U.S. PATENT DOCUMENTS

| | | | |
|---|---|---|---|
| 6,381,537 B1 | 4/2002 | Chenault et al. | |
| 6,559,776 B2 | 5/2003 | Katz | |
| 6,640,187 B1 | 10/2003 | Chenault et al. | |
| 6,927,700 B1 | 8/2005 | Quinn | |
| 7,215,255 B2 | 5/2007 | Grush | |
| 7,312,722 B2 | 12/2007 | Tillotson et al. | |
| 7,474,232 B2 | 1/2009 | Chen et al. | |
| 7,783,530 B2 | 8/2010 | Slemmer et al. | |
| 8,576,092 B2 | 11/2013 | Levy et al. | |
| 8,635,017 B2 | 1/2014 | Geelen et al. | |
| 8,890,715 B2 * | 11/2014 | Geelen | G01C 21/32 340/426.19 |
| 2002/0109610 A1 | 8/2002 | Katz | |
| 2004/0181495 A1 | 9/2004 | Grush | |
| 2004/0254840 A1 | 12/2004 | Slemmer et al. | |
| 2005/0119010 A1 | 6/2005 | Yasukawa | |
| 2006/0250278 A1 | 11/2006 | Tillotson et al. | |
| 2006/0267799 A1 | 11/2006 | Mendelson | |
| 2007/0129974 A1 | 6/2007 | Chen et al. | |
| 2008/0048885 A1 | 2/2008 | Quinn | |
| 2008/0065325 A1 | 3/2008 | Geelen et al. | |
| 2008/0201074 A1 * | 8/2008 | Bleckman | G01C 21/30 701/431 |
| 2009/0248577 A1 * | 10/2009 | Hoj | G07B 15/063 705/40 |
| 2010/0106514 A1 * | 4/2010 | Cox | G01C 21/20 705/1.1 |
| 2010/0211304 A1 * | 8/2010 | Hwang | G01C 21/3484 701/532 |
| 2011/0140922 A1 | 6/2011 | Levy et al. | |

FOREIGN PATENT DOCUMENTS

| | | |
|---|---|---|
| JP | 2005249539 A | 9/2005 |
| JP | 2008002978 A | 1/2008 |
| JP | 2009086993 A | 4/2009 |
| JP | 2009524041 A | 6/2009 |
| WO | 2007083997 A1 | 7/2007 |

OTHER PUBLICATIONS parking-net.com/.../Find-Available-Parking-on-Your-Mobile-Phone ParkWhiz, Apr. 3, 2008 [retrieved on Nov. 1, 2011].

International Search Report issued May 6, 2009 for International Application No. PCT/EP2009/050376.

International Search Report issued Apr. 6, 2009 for International Application No. PCT/EP2009/050378.

International Preliminary Report on Patentability and Written Opinion of the International Search Authority issued on Jul. 19, 2011 for International Application No. PCT/EP2009/050378.

* cited by examiner

NAVIGATION APPARATUS, SERVER APPARATUS AND METHOD OF COLLECTING PARKING LOCATION INFORMATION

The present application is a continuation of U.S. patent application Ser. No. 13/202,115 filed on Dec. 23, 2011, which is the National Stage of International Application No. PCT/EP2009/050378 filed Jan. 14, 2009 and designating the United States. The entire content of these applications is incorporated herein by reference.

FIELD OF THE INVENTION

The present invention relates to a navigation apparatus of the type that, for example, is capable of performing location determination. The present invention also relates to a server apparatus of the type that, for example, analyses location data relating to change of location of a navigation apparatus with time. The present invention further relates to a method of collecting parking location information, the method being of the type that, for example, analyses location data relating to change of location of a navigation apparatus with time.

BACKGROUND TO THE INVENTION

Portable computing devices, for example Portable Navigation Devices (PNDs) that include GPS (Global Positioning System) signal reception and processing functionality are well known and are widely employed as in-car or other vehicle navigation systems.

In general terms, a modern PND comprises a processor, memory and map data stored within said memory. The processor and memory cooperate to provide an execution environment in which a software operating system is typically established, and additionally it is commonplace for one or more additional software programs to be provided to enable the functionality of the PND to be controlled, and to provide various other functions.

Typically, these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but can be on a steering wheel if the device is built into a vehicle), and a microphone for detecting user speech. In one particular arrangement, the output interface display may be configured as a touch sensitive display (by means of a touch sensitive overlay or otherwise) additionally to provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Bluetooth, Wi-Fi, Wi-Max, GSM, UMTS and the like.

PNDs of this type also include a GPS antenna by means of which satellite-broadcast signals, including location data, can be received and subsequently processed to determine a current location of the device.

The PND may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically, such features are most commonly provided in in-vehicle navigation systems, but may also be provided in PNDs if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the drivers own preferences for the factors determining road choice (for example the driver may specify that the route should not include motorways or toll roads).

The device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking), are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant), a media player, a mobile telephone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server with which the user's computing resource is communicating calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated, a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

As mentioned above, it is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the GO 930 Traffic model manufactured and supplied by TomTom International B.V., provide a reliable means for enabling users to navigate from one position to another. Such devices are of great utility when the user is not familiar with the route to the destination to which they are navigating.

As indicated above, one or more POIs can be selected by a user of the PND in respect of a journey to be embarked upon or during a journey. To select a POI during a journey, a user typically negotiates a menu structure of a user interface of the PND in order to select a category of POI desired, for example a supermarket or a car park. The application software of the PND then identifies, using locally stored data, a number of POIs of the type selected by the user, for example car parks, and presents the identified car parks to the user via the user interface. Furthermore, as a "value added" service, it is desirable for the PND to provide more information in relation to a car park or even a parking space. In this respect, a notional "parking service" is capable of advising a user as to a location where a vehicle can be parked, and possibly whether the space is vacant. Indeed, such a service can be configured, if desired, only to show parking spaces that are vacant. Typically, the parking service shows the user the closest parking spaces. To assist the user, the application software of the PND typically orders the car parks identified by distance from a current location of the PND and indicates an associated distance value adjacent the car park listed. The user can then select one of the car parks identified by the user interface and other parts of the application software. In response to selection by the user of one of the car parks identified by the application software, the application software either sets the car park selected as a waypoint or an ultimate destination and the PND then calculates a route either via the car park selected or to the car park selected, as appropriate. The selection of the car park as a destination or a waypoint can similarly be made in relation to functionality of the PND to prepare a route or an itinerary. Of course, if the user is already en-route and the PND is already providing navigation assistance, the PND integrates the car park chosen into an existing route calculated, for example by recalculating the existing route to take into account the selection made by the user. However, whilst the above notional parking service is desirable, practical implementation in the terms described above is problematic, because knowledge of the occupancy status of a given parking space or a car park is not known in absolute terms as the PND is not omniscient.

The above-described parking services are extremely useful in assisting a user reach a destination with maximum convenience. However, the above service presupposes that the PND has a database of POIs stored locally by the PND comprising accurate, complete and up-to-date records of parking opportunities, for example parking lots or parking spaces. Similar considerations apply even if POI information is stored remotely with respect to the PND and the PND acquires information relating to the parking opportunities from a remote server via a communications network, for example a Wide-Area Network (WAN). Indeed, new parking opportunities are created over a time and so do not feature in the database of POIs until the provider of the database of POIs decides to release an update of the database of POIs. Sometimes, the delay between releases can be considerable resulting in the PND having access to an incomplete and/or inaccurate database of parking information.

SUMMARY OF THE INVENTION

According to a first aspect of the present invention, there is provided a navigation apparatus comprising: a processing resource operably coupled to a receiver for location-related data and arranged to perform, when in use, location determination, the processing resource supporting a parking location determination module; wherein the parking location determination module is arranged to determine when the location determined is substantially unchanged and to determine that the location determined constitutes a candidate parking location in response to the location determined remaining substantially unchanged relative to a predetermined period of time.

The predetermined period of time may be about 2 minutes or more, for example about 5 minutes, about 10 minutes, about 15 minutes, about 30 minutes, about 1 hour or about 2 hours.

The parking location determination module may be arranged to determine that the location determined constitutes the candidate parking location in response to the location determined remaining substantially unchanged for the predetermined period of time or more than the predetermined period of time.

The apparatus may further comprise a user interface for communicating with a user. The processing resource and the user interface may be arranged to solicit input from the user as to whether the candidate parking location is an actual parking location.

The processing resource may be arranged to obtain permission to share the identity of the candidate parking location. The processing resource may be arranged to communicate the identity of the candidate parking location in response to obtaining the permission to share the identity of the candidate parking location.

The identity of the candidate parking location may be expressed as coordinates.

The parking location determination module may be arranged to determine whether the candidate parking location is a roadside location.

The parking location determination module may be arranged to store the substantially unchanged location and identify reoccurrence of use of the candidate parking location; and the parking location determination module may be arranged to infer from a frequency of the reoccurrence being greater than or equal to a predetermined event value that the candidate parking location is an actual parking location.

The parking location determination module may be arranged to store the substantially unchanged location and identify instances of other stored substantially unchanged locations within a predetermined distance of the substantially unchanged location; and the parking location determination module may be arranged to identify a pattern in the stored substantially unchanged locations indicative of a collection of parking locations, thereby inferring that the candidate parking location is an actual parking location.

The collection of parking locations may be arranged as a row.

The parking location determination module may be arranged to identify use of different substantially unchanged locations over a period of time.

According to a second aspect of the present invention, there is provided a portable navigation device comprising the navigation apparatus as set forth above in relation to the first aspect of the present invention.

According to a third aspect of the present invention, there is provided a vehicle comprising the navigation apparatus as set forth above in relation to the first aspect of the present invention.

According to a fourth aspect of the present invention, there is provided a navigation information system comprising: a server apparatus; a navigation apparatus as set forth above in relation to the first aspect of the present invention; and a communications network, the navigation apparatus being capable of communicating with the server apparatus via the communication network; wherein the navigation apparatus is arranged to communicate the identity of the candidate parking location to the server apparatus.

The server apparatus may be arranged to respond to requests from the navigation apparatus for an identity of a parking location conforming to a predetermined criterion.

The predetermined criterion may be a distance from a specified location.

According to a fifth aspect of the present invention, there is provided a server apparatus for enriching a database of parking location information, the apparatus comprising: an input for receiving log data associated with movement of a navigation apparatus; a processing resource arranged to support a parking location determination module, the parking location determination module being arranged to determine from the log data when the location determined was substantially unchanged and to determine that the location determined constitutes a candidate parking location in response to the location determined having remained substantially unchanged relative to a predetermined period of time.

According to a sixth aspect of the present invention, there is provided a method of collecting parking location information, the method comprising: analysing location data relating to change of location of a navigation apparatus with time; determining when a location of the navigation apparatus is substantially unchanged; and determining that the location determined constitutes a candidate parking location in response to the location determined remaining substantially unchanged relative to a predetermined period of time.

The method may further comprise soliciting a user as to whether the candidate parking location is an actual parking location.

The method may further comprise obtaining permission to share the identity of the candidate parking location.

The method may further comprise determining whether the candidate parking location is a roadside location.

The method may further comprise: storing the substantially unchanged location; identifying reoccurrence of use of the candidate parking location; inferring from a frequency of the reoccurrence being greater than or equal to a predetermined event value that the candidate parking location is an actual parking location.

The method may further comprise: storing the substantially unchanged location; identifying instances of other stored substantially unchanged locations within a predetermined distance of the substantially unchanged location; identifying a pattern in the stored substantially unchanged locations indicative of a collection of parking locations; and inferring that the candidate parking location is an actual parking location.

According to a seventh aspect of the present invention, there is provided a computer program element comprising computer program code means to make a computer execute the method as set forth above in relation to the fourth aspect of the invention.

The computer program element may be embodied on a computer readable medium.

Advantages of these embodiments are set out hereafter, and further details and features of each of these embodiments are defined in the accompanying dependent claims and elsewhere in the following detailed description.

It is thus possible to provide a navigation apparatus, server apparatus and a method of collecting parking location information that enables a database of parking locations to be created and/or maintained so as to provide as complete repository of parking locations as possible for any number of parking related services that can be supported by the navigation apparatus. The method and apparatus provide a low-cost and minimally intrusive way of building and/or maintaining map data in respect of parking locations.

BRIEF DESCRIPTION OF THE DRAWINGS

At least one embodiment of the invention will now be described, by way of example only, with reference to the accompanying drawings, in which.

DETAILED DESCRIPTION OF PREFERRED EMBODIMENTS

Figure 1:
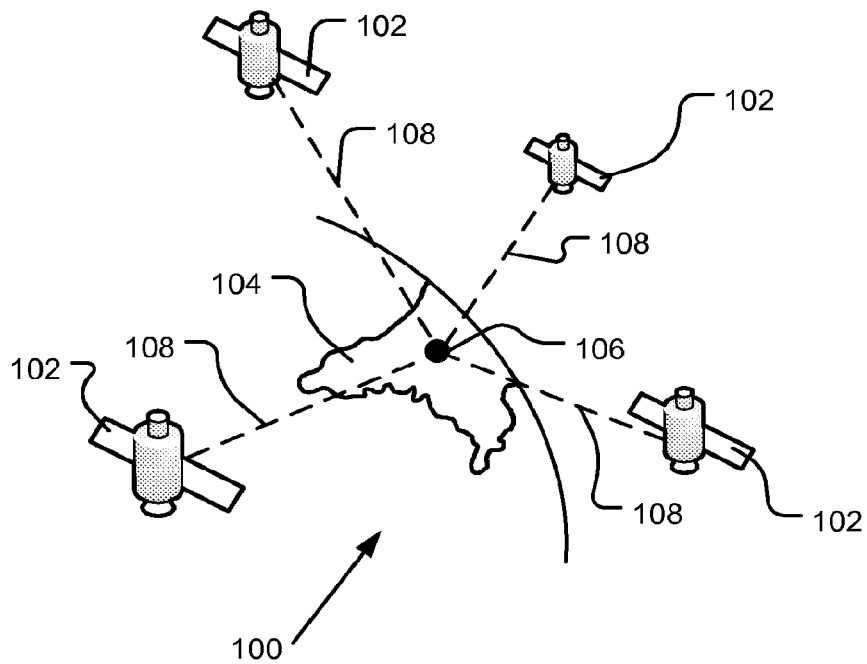
FIG. 1 is a schematic illustration of an exemplary part of a Global Positioning System (GPS) usable by a navigation apparatus.

Throughout the following description identical reference numerals will be used to identify like parts.

One or more embodiments of the present invention will now be described with particular reference to a PND. It should be remembered, however, that the teachings herein are not limited to PNDs but are instead universally applicable to any type of processing device, for example but not essentially those configured to execute navigation software in a portable and/or mobile manner so as to provide route planning and navigation functionality. It follows therefore that in the context of the embodiments set forth herein, a navigation apparatus is intended to include (without limitation) any type of route planning and navigation apparatus, irrespective of whether that device is embodied as a PND, a vehicle such as an automobile, or indeed a portable computing resource, for example a portable personal computer (PC), a mobile telephone or a Personal Digital Assistant (PDA) executing, for example, route planning and navigation software. Indeed, a mobile telephone, smartphone or the like can simply be employed in respect of some embodiments without the benefit of route planning or navigation software.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
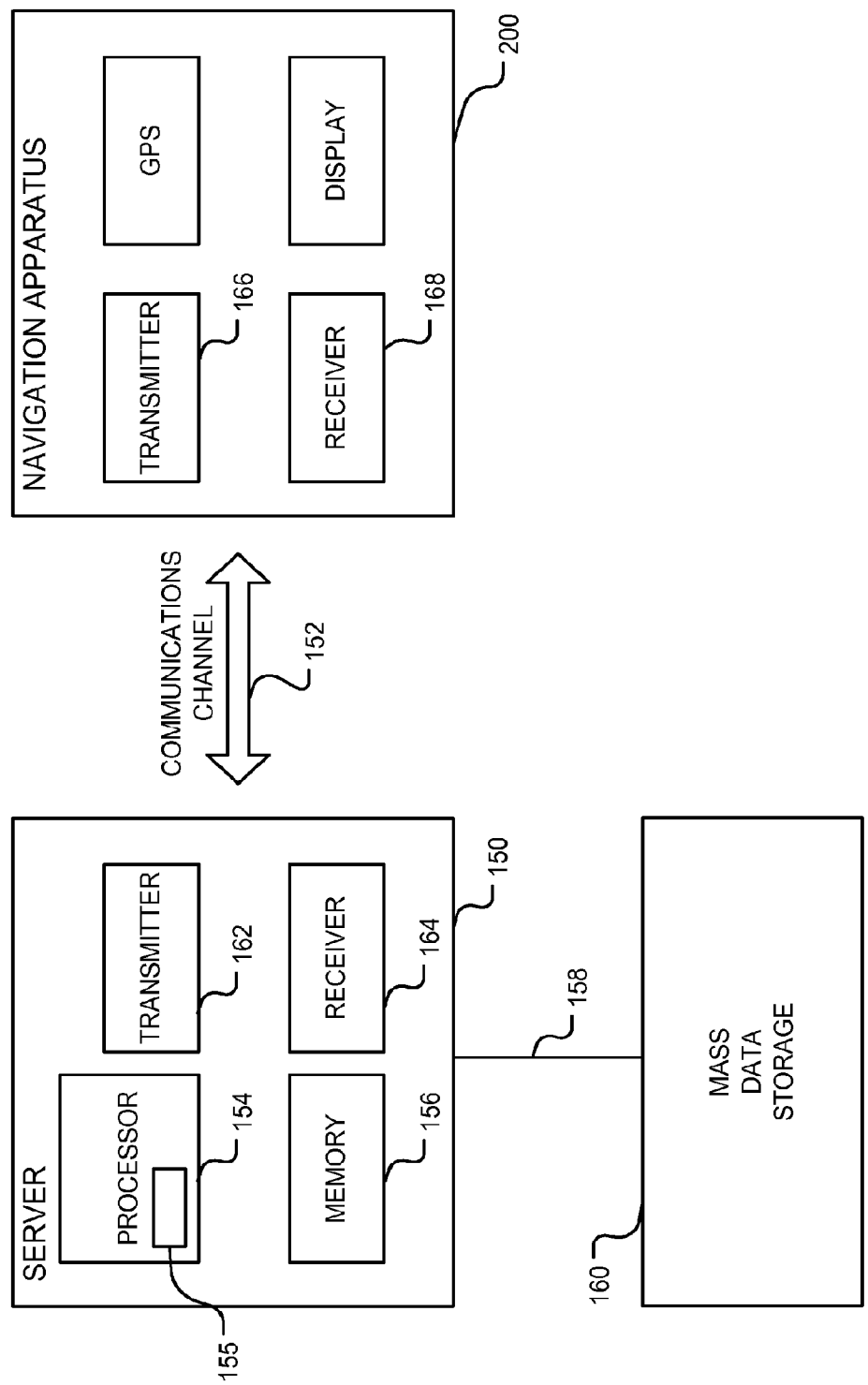
FIG. 2 is a schematic diagram of a navigation system or data collection system supporting communication between a navigation apparatus and a server apparatus.

In FIG. 2, a navigation system comprises a navigation apparatus 200 capable of communicating, if desired in an embodiment, with a server 150 via a communications channel 152 supported by a communications network that can be implemented by any of a number of different arrangements. The communication channel 152 generically represents the propagating medium or path that connects the navigation apparatus 200 and the server 150. The server 150 and the navigation apparatus 200 can communicate when a connection via the communications channel 152 is established between the server 150 and the navigation apparatus 200 (noting that such a connection can be a data connection via mobile device, a direct connection via personal computer (not shown) via the internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications signals, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 is supported by telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication if required.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 152. These signals may be modulated, encrypted and/or compressed signals as may be desirable for the communication technology.

In this example, the navigation apparatus 200 comprising or coupled to the GPS receiver device 106, is capable of establishing a data session, if required, with network hardware of a communications network, for example a "mobile" communications network via a wireless communications terminal (not shown), such as a mobile telephone, PDA, and/or any device with mobile telephone technology, in order to establish a digital connection, for example a digital connection via known Bluetooth technology. Thereafter, through its network service provider, the mobile terminal or user equipment can establish a network connection (through the Internet for example) with the server 150. As such, a "mobile" network connection can be established between the navigation apparatus 200 (which can be, and often times is, mobile as it travels alone and/or in a vehicle) and the server 150 to provide a "real-time" or at least very "up to date" gateway for information.

In this example, the navigation apparatus 200 is a Bluetooth enabled navigation apparatus in order that the navigation apparatus 200 can be agnostic to the settings of the wireless communications terminal, thereby enabling the navigation apparatus 200 to operate correctly with the ever changing spectrum of mobile telephone models, manufacturers, etc. Model/manufacturer specific settings can, for example, be stored on the navigation apparatus 200, if desired. The data stored for this information can be updated.

Although not shown, instead of requiring the wireless communications terminal to provide access to the communications network, the navigation apparatus 200 can, of course, comprise mobile telephone technology, including an antenna, for example, or optionally using an internal antenna of the navigation apparatus 200. The mobile telephone technology within the navigation apparatus 200 can also include an insertable card (e.g. Subscriber Identity Module (SIM) card). As such, mobile telephone technology within the navigation apparatus 200 can similarly establish a network connection between the navigation apparatus 200 and the server 150, via the Internet for example, in a manner similar to that of any wireless communications-enabled terminal.

As explained above, the establishing of the network connection between the mobile device (via a service provider) and another device such as the server 150, using the Internet for example, can be done in any suitable known manner. In this respect, any number of appropriate data communications protocols can be employed, for example the TCP/IP layered protocol. Furthermore, the mobile device can utilize any number of communication standards such as CDMA2000, GSM, IEEE 802.11a/b/c/g/n, etc.

Hence, it can be seen that the Internet connection can be utilised, which can be achieved via a data connection using the mobile telephone or mobile telephone technology.

The server 150 includes, in addition to other components which may not be illustrated, a processor 154 constituting a processing resource and operatively connected to a memory 156 and further operatively connected, via a wired or wireless connection 158, to a mass data storage device 160. The mass storage device 160 contains a store of, inter alia, navigation data and map information. Further details of such data are set out later below. The mass storage device 160 can again be a separate device from the server 150 or can be incorporated into the server 150. The processor 154 is further operatively connected to transmitter 162 and receiver 164, to transmit and receive information to and from the navigation apparatus 200 via the communications channel 152. The signals sent and received may include data, communication, and/or other propagated signals. The transmitter 162 and receiver 164 may be selected or designed according to the communications requirement and communication technology used in the communication design for the navigation system. Further, it should be noted that the functions of transmitter 162 and receiver 164 may be combined into a single transceiver.

As mentioned above, the navigation apparatus 200 can be arranged to communicate with the server 150 through communications channel 152, using transmitter 166 and receiver 168 to send and receive data through the communications channel 152, noting that these devices can further be used to communicate with devices other than the server 150. Further, the transmitter 166 and receiver 168 are selected or designed according to communication requirements and communication technology used in the communication design for the navigation system and the functions of the transmitter 166 and receiver 168 may be combined into a single transceiver in a like manner to that described above in relation to the server apparatus 150. Of course, the navigation apparatus 200 comprises other hardware and/or functional parts, which will be described later herein in further detail.

Software stored in server memory 156 provides instructions for the processor 154 and allows the server 150 to provide services to the navigation apparatus 200 and/or perform other data processing tasks. For example, the server apparatus 150 can provide a service involving processing requests for parking location information from the navigation apparatus 200 and transmitting the parking location information from the mass data storage 160 to the navigation apparatus 200. Another service that can be provided by the server 150 includes processing navigation data using various algorithms for a desired application and sending the results of these calculations to the navigation apparatus 200. Of course, the server apparatus 150 can support other functionality as will be described in further detail later below.

The server 150 can be used as a remote source of data accessible by the navigation apparatus 200 via, for example, a wireless channel. The server 150 may include a network server located on a local area network (LAN), wide area network (WAN), virtual private network (VPN), etc. Indeed, as mentioned above, a Personal Computer (PC) can be connected between the navigation apparatus 200 and the server 150 to establish an Internet connection between the server 150 and the navigation apparatus 200.

The navigation apparatus 200 may be provided with information from the server 150 via information downloads which may be periodically updated automatically or upon a user connecting the navigation apparatus 200 to the server 150 and/or may be more dynamic upon a more constant or frequent connection being made between the server 150 and navigation apparatus 200 via a wireless mobile connection device.

Figure 3:
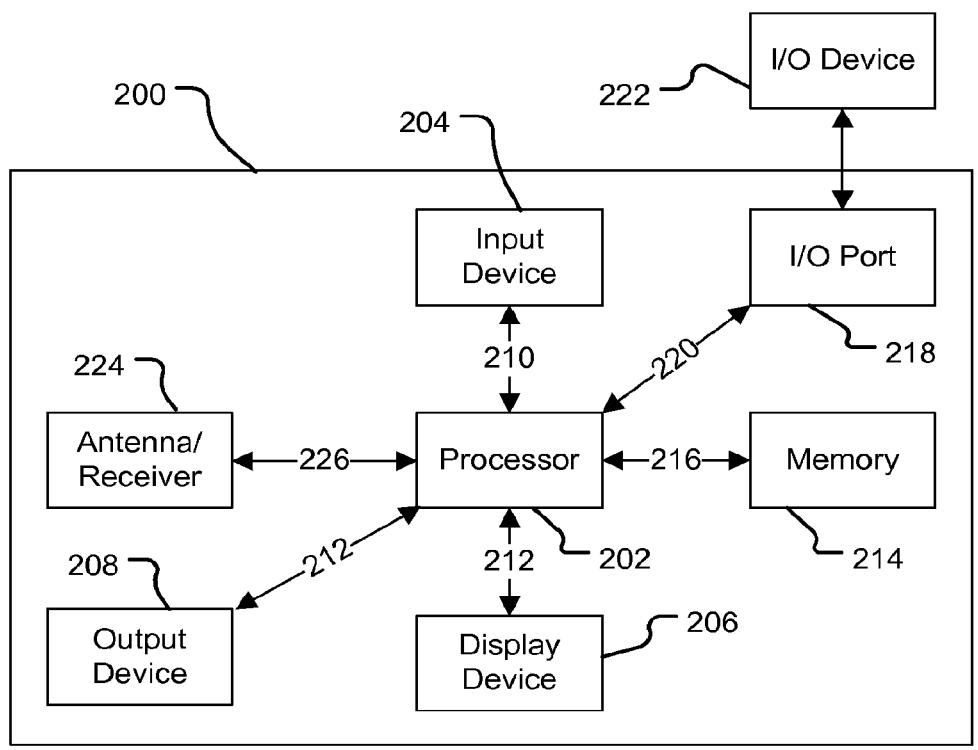
FIG. 3 is a schematic illustration of electronic components of the navigation apparatus of FIG. 2 or any other suitable navigation apparatus.

Referring to FIG. 3, it should be noted that the block diagram of the navigation apparatus 200 is not inclusive of all components of the navigation apparatus, but is only representative of many example components. The navigation apparatus 200 is located within a housing (not shown). The navigation apparatus 200 includes a processor 202, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation apparatus 200, the processor 202 is operatively connected to and capable of receiving input information from input device 204 via a connection 210, and operatively connected to at least one of the display screen 206 and an output device 208, via respective output connections 212, to output information thereto. The output device 208 is, for example, an audible output device (e.g. a loudspeaker). As the output device 208 can produce audible information for a user of the navigation apparatus 200, it should equally be understood that input device 204 can include a microphone and software for receiving input voice commands as well. Further, the navigation apparatus 200 can also include any additional input device 204 and/or any additional output device, such as audio input/output devices for example. The processor 202 is operably coupled to a memory resource 214 via connection 216 and is further adapted to receive/send information from/to input/output (I/O) ports 218 via connection 220, wherein the I/O port 218 is connectable to an I/O device 222 external to the navigation apparatus 200. The memory resource 214 comprises, for example, a volatile memory, such as a Random Access Memory (RAM) and a non-volatile memory, for example a digital memory, such as a flash memory. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish the data connection between the navigation apparatus 200 and the server 150 via the Internet or any other network for example.

FIG. 3 further illustrates an operative connection between the processor 202 and an antenna/receiver 224 via connection 226, wherein the antenna/receiver 224 can be a GPS antenna/receiver for example. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. As will be understood by one of ordinary skill in the art, different configurations of the components shown in FIG. 3 are contemplated. For example, the components shown in FIG. 3 may be in communication with one another via wired and/or wireless connections and the like. Thus, the navigation apparatus 200 described herein can be a portable or handheld navigation apparatus 200.

Figure 4:
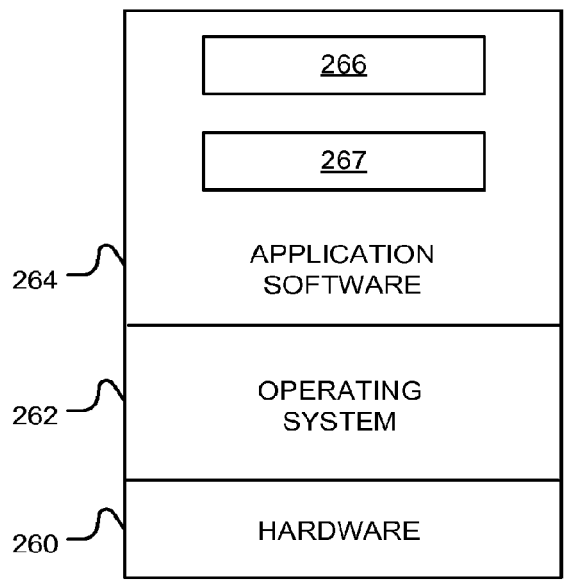
FIG. 4 is a schematic representation of an architectural stack employed by the navigation apparatus of FIG. 3.

Turning to FIG. 4, the memory resource 214 stores a boot loader program (not shown) that is executed by the processor 202 in order to load an operating system 262 from the memory resource 214 for execution by functional hardware components 260, which provides an environment in which application software 264 can run. The operating system 262 serves to control the functional hardware components 260 and resides between the application software 264 and the functional hardware components 260. The application software 264 provides an operational environment including the GUI that supports core functions of the navigation device 200, for example map viewing, route planning, navigation functions and any other functions associated therewith. Part of the application software 264 comprises a parking location determination module 266 and a route calculation module 267 that supports route calculation functionality. Further details of the route calculation module 267 will be described later herein in relation to subsequent embodiments.

Figure 5:
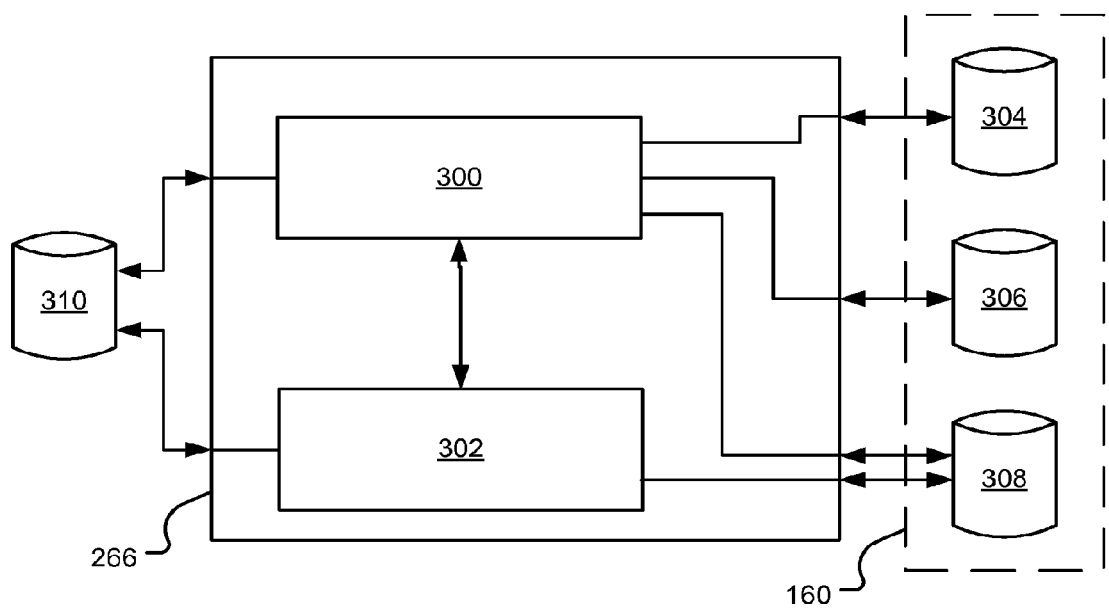
FIG. 5 is a schematic diagram of a parking location determination module of FIG. 4 in greater detail.

Referring to FIG. 5, the parking location determination module 266 comprises a data pre-processor 300 capable of communicating with an inference engine 302. The data pre-processor 300 is operably coupled, via the WAN mentioned above, to a remote map data sharing database 304, a remote trip data database 306 and a remote POI database 308. The inference engine 302 is also capable of accessing the remote POI database 308. The map data sharing database 304 is a database of map-related information to which users of navigation apparatus can contribute information, for example road blocks, identities of new roads, and corrections of map features, and identities and locations of new points of interest.

Additionally, the data pre-processor 300 and the inference engine 302 are operably coupled to a temporary data store 310.

Operation of the above server apparatus 150 will now be described in the context of trip data having been generated by a population or community of navigation apparatus and communicated to the server apparatus 150 or another computing resource in order to create and/or supplement the trip data database 306. In this respect, each of the navigation apparatus in the population, for example the navigation apparatus 200, is configured with an ability to collect trip information relating to a planned or unplanned itinerary or journey of the navigation apparatus 200, including temporal information. A record of changes of location with time can be kept. Recordal of the events can, if desired, be conditional upon a certain criterion being met, for example a location calculated being substantially unchanged for a minimum predetermined period of time. The trip data is recorded in a log, for example a log file, which is stored by the digital memory of the navigation apparatus 200. The log is communicated to the server apparatus 150 when a communications session is next established between the navigation apparatus 200 and the server apparatus 150, for example using the TomTom HOME system whereby the navigation apparatus 200 is docked with the Personal Computer (PC) (mentioned above) or other computing device and the communications session is established via an Internet connection to which the PC is coupled. Data transfers can thus take place between the navigation apparatus 200 and the server 150. In this example, the data transfer includes transferring the trip log, mentioned above and generated by the navigation apparatus 200, to the server apparatus 150, the content of the log file being stored in the trip data database 306. The trip data database 306 will thus comprise, inter alia, location data and temporal data, for example a timestamp or other indication in order to identify a point or period in time to which the location data stored relates, such as when a navigation apparatus was at a given location. In this example, the location data is recorded as longitude and latitude coordinates. Of course, if the navigation apparatus 200 is suitably equipped to support wireless communications over a WAN, for example where the navigation apparatus 200 is equipped with a cellular telephone module or operably coupled to a mobile telephone, the navigation apparatus 200 can send periodic updates to the server apparatus 150 without having to wait to be docked with the PC.

Figure 6:
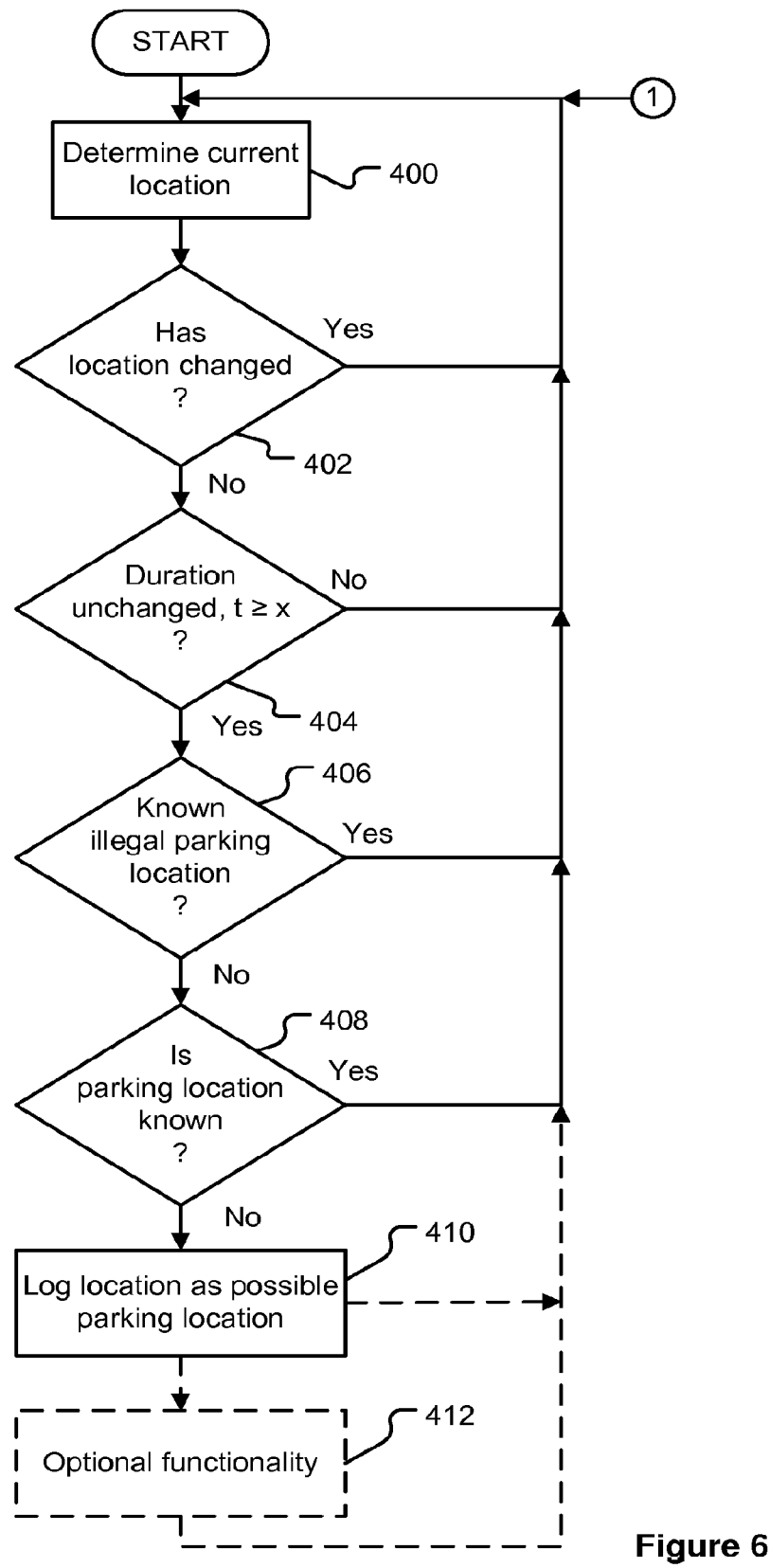
FIG. 6 is a flow diagram of a method of collecting parking location information constituting an embodiment of the invention.

In operation (FIG. 6) of a first embodiment, the navigation apparatus 200 is assumed to be powered-up and travelling. The navigation apparatus 200 can be moving as a result of a user following a route in respect of which the navigation apparatus 200 is providing navigation support or the navigation apparatus 200 can be moving simply as a result of the navigation device 200 being powered-up but not providing navigation support as this is not required by the user, for example when the user and/or a driver of a vehicle is engaged in the free driving mentioned above. As this aspect is not essential to an understanding of this example, selection of a destination location for route calculation purposes (if required) will not be described in further detail in relation to this example.

At a point in a journey, for example at an end of the journey or at a waypoint in the journey, the vehicle may stop for a varying amount of time depending upon the nature of the stoppage. Typically, the driver of the vehicle stops the vehicle on a parking location, for example a parking space by a roadside, in a ground-level parking lot or car park or in a multi-storey parking lot or car park. As mentioned above, the time can vary, but typically in this example the vehicle is considered to be in a "parked" state if the vehicle remains substantially stationary for a predetermined period of time or more than the predetermined period of time. The predetermined period of time is, in this example, about 5 minutes, although the predetermined period of time can be a shorter period of time, for example about 2 minutes, if desired. However, the shorter the predetermined period of time, the more likely so-called false-positives are to occur in relation to detection of parking locations. The predetermined period of time can also be greater, for example about 10 minutes, about 15 minutes, about 30 minutes, about 1 hour or about 2 hours, if desired.

In order to detect parking locations, the data pre-processor 300 ascertains (Step 400) a current location of the navigation apparatus 200. This information is calculated by the application software 264 from data received by the GPS receiver 224 and other means, for example accelerometers and dead reckoning techniques, and so available to the data pre-processor 300. The data pre-processor 300 then determines (Step 402) whether the current location has changed. Of course, an initial location determination will not have a counterpart preceding location with which to compare, but subsequent location determinations do not suffer from this minor impediment. The application software 264 calculates the current location periodically and this information is acquired by the data pre-processor 300 periodically too. Consequently, when the current location is deemed by the data pre-processor 300 as substantially unchanged, the data pre-processor 300 simply continues to acquire the current location periodically.

However, when the data pre-processor 300 determines (Step 402) that the coordinates of the current location are substantially unchanged, the data pre-processor 300 then determines (Step 404) whether the current locations have remained substantially unchanged for, in this example, at least the predetermined period of time, x, for example about 5 minutes. If the current location has not remained substantially unchanged for at least the predetermined period of time, for example if insufficient time has yet elapsed, the data pre-processor 300 continues to monitor the current location as described above (Steps 400, 402).

Alternatively, should the current location remain substantially unchanged for at least the predetermined period of time, x, the data pre-processor 300 then communicates the identity of the current location, for example by communication of coordinates, to the inference engine 302. The inference engine 302 then assesses whether the current location should be considered as a candidate parking location, for example by reference to a local POI database (not shown) stored in the memory resource 214 or the remote POI database 308. In this respect, if the current location corresponds to a location where it is known to be illegally parked, for example in a zone where parking is illegal, such as so-called "red-routes" in London, UK or bus lanes, then the current location is disregarded for further consideration and the above-described process (Steps 400 to 406) is repeated. Similarly, the inference engine 302 queries the local POI database or the remote POI database 308 in order to determine (Step 408) if the current location is already known to correspond to a parking location. If the current location is determined to correspond to a known parking location, then the current location need not be considered further as a candidate parking location as the parking location is clearly known from the local POI database and/or the remote POI database 308.

If the current location is determined by the inference engine 302 as not known to be associated with a known parking location, the inference engine 302 therefore stores (Step 410) the current location locally, in this example, in a database of candidate locations (not shown) for subsequent communication to the server apparatus 150, for example when other log data is communicated to the server apparatus 150 as described above. The identity of the candidate parking location can again be expressed as coordinates. In this example, the data pre-processor 300 then returns to monitoring the current location in the manner already described above (Steps 400 to 408).

At the server apparatus 150, the current location can be stored for further analysis in order to verify that the current location does correspond to an actual parking location, for example by manual investigation or by corroboration with other reports of the same candidate parking location as constituting an actual parking location. Once the candidate parking location has been validated, the candidate parking location can be added to the POI database 308.

Figure 7:
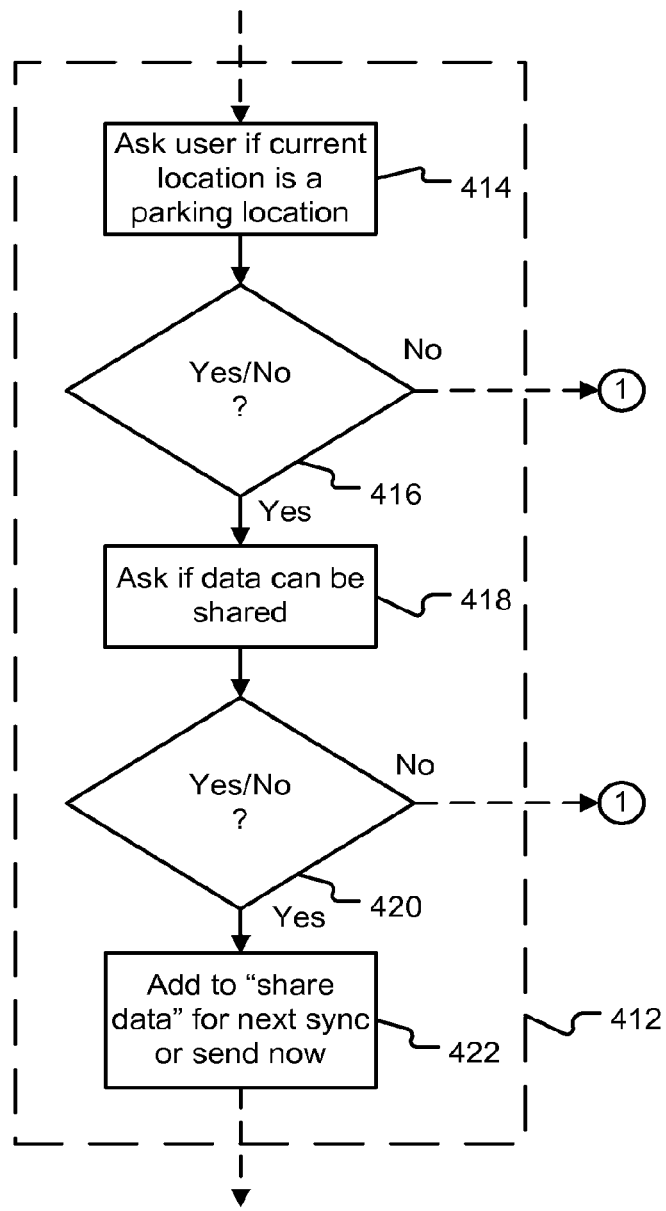
FIG. 7 is a flow diagram of optional functionality for the method of FIG. 6 and constituting another embodiment of the invention.

In the above-described embodiment, the candidate parking location is communicated to the server apparatus 150 without further verification at the user-end. In another embodiment, however, the navigation apparatus 200 can provide additional optional functionality (Step 412) in order to solicit input from the user once the candidate parking location has been identified. In this respect (FIG. 7), the inference engine 302 interacts with the user interface in order to ask (Step 414) the user whether the candidate parking location is an actual parking location, for example by displaying a question and "Yes" and "No" virtual buttons (Step 416) to collect the response from the user. If the user presses the "No" virtual button, then the inference engine 302 removes the candidate parking location from the database of candidate locations and returns to monitoring the current location in the manner already described above (Steps 400 to 410).

If the user has pressed the "Yes" virtual button, the inference engine 302 is provided with a strong indicator, assuming the user is not behaving maliciously, that the candidate parking location corresponds to an actual parking location. The inference engine 302, acting through the user interface, can ask (Step 418) the user for permission to share the information, for example communication of the candidate parking location and the confirmation obtained from the user to the server apparatus 150. Of course, sharing of such data can be pre-configured, for example during initial configuration of the navigation apparatus 200, and so the subsequent request for permission (Step 418) described can be obviated. However, assuming permission to share the candidate parking location and the user confirmation was not initially obtained, the inference engine 302 awaits (Step 420) a response from the user. If the user decides not to grant permission to the navigation apparatus 200 to share the information, the candidate parking location remains, in this example, in the database of candidate location for future local use by the navigation apparatus 200 and the data pre-processor 300 returns to monitoring the current location of the navigation apparatus 200 in the manner already described above (Steps 400 to 410). Alternatively, if the user presses the "Yes" virtual button (Step 420), the entry in the database of candidate parking locations, comprising the candidate parking location and the user confirmation thereof, is tagged (Step 422) for communication to the server apparatus 150 at a next available opportunity, for example when a periodic communication with the server apparatus 150 takes place as already described above.

Of course, the skilled person should appreciate that, within the optional functionality 412, the request for permission to share data is also optional and need not be implemented in all embodiments.

Once the entry in the database of candidate parking locations has been tagged and/or otherwise consigned for communication, the data pre-processor 300 returns to monitoring the current location of the navigation apparatus 200 in the manner already described above (Steps 400 to 410) in order to discover any further parking locations.

Figure 8:
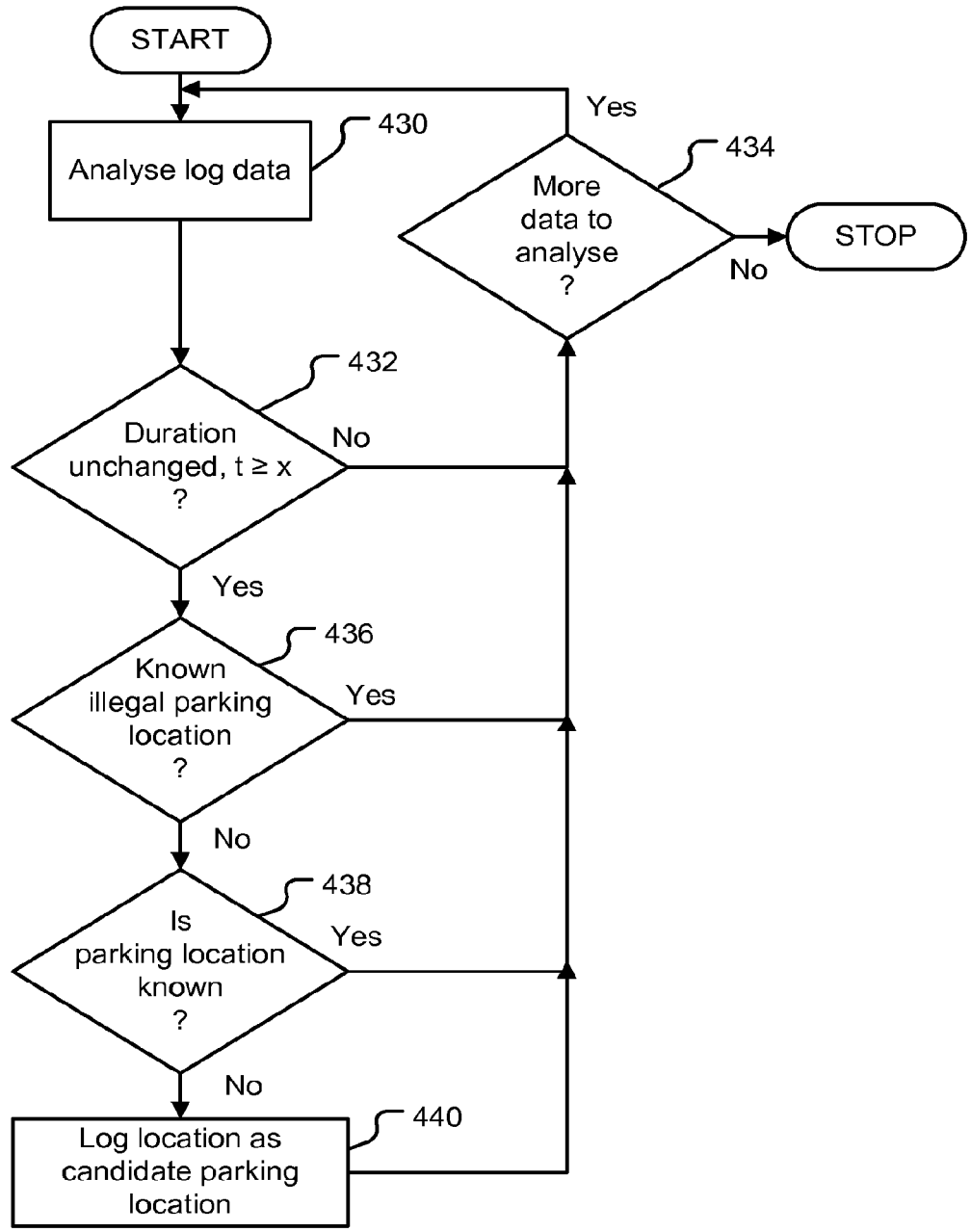
FIG. 8 is a flow diagram of another method of determining a location of a parking location constituting a further embodiment of the invention.

In another embodiment, anonymised log data collected and communicated to the server apparatus 150 can be subjected to server-side processing instead of local determining by the navigation apparatus 200 as to whether a current location constitutes a candidate parking location. Turning to FIG. 8, an analysis engine 155 constituting another parking location determination module is supported by the server apparatus 150, the analysis engine 155 analysing (Step 430) the log data received in respect of the navigation apparatus 200. The analysis engine 155 tries to identify (Step 432) locations recorded that are substantially unchanged with respect to time for, in this example, at least the predetermined period of time, x. This process is repeated until a location that is substantially unchanged for at least the predetermined period of time, x, has been found by the analysis engine 155 or all the data in the log has been analysed (Step 434). The analysis engine then assesses (Step 436) whether the location found (the "current location") should be considered as a candidate parking location, for example by reference to the POI database 308. In this respect, if the current location corresponds to a location where it is known from the POI database 308 to be illegally parked, for example a zone where parking is illegal as already mentioned above in relation to the previous embodiment, then the current location is disregarded for further consideration by the analysis engine 155 and the above process of analysing the log data for further locations that are substantially unchanged for at least the predetermined period of time (Steps 430 to 434) is continued until all the data in the log has been analysed (Step 434). Similarly, the analysis engine 155 queries the POI database 308 in order to determine (Step 438) whether the current location is already known to correspond to a parking location. If the current location is known to correspond to a known parking location, then the current location need not be considered further as the candidate parking location as the parking location is already know from the POI database 308.

If the current location is determined (Step 438) by the analysis engine 155 to be an unknown candidate parking location, the analysis engine stores (Step 440) the current location in another database of candidate locations (not shown) local to the server 150 for further analysis in order to verify that the current location does correspond to an actual parking location, for example by manual investigation or by corroboration with results of analysis of log data of other navigation apparatus. Once the candidate parking location has been validated, the candidate parking location is added to the POI database 308.

In yet another embodiment, the candidate parking locations can be subjected to further analysis prior to acceptance as an actual parking location. In one example, the analysis engine 155 also supports a pattern matching engine (not shown) that assesses the another database of candidate parking locations in order to perform pattern matching and/or inference in relation to the candidate parking locations stored in the another database of candidate parking locations. In this respect, the pattern matching engine is configured to recognise (Step 450) clusters or groupings of candidate parking locations within a predetermined distance. The analysis then attempts to recognise (Step 452) distributions of candidate parking locations that are commonly associated with collections of parking locations. For example, a row of candidate locations can be indicative of a set of roadside parking spaces, and a collection of substantially regularly arranged candidate parking locations can be indicative of a parking lot. Indeed, location information obtained from the navigation apparatus 200 can be used to determine, with greater certainty, whether a candidate parking location is a roadside parking location or one of a number of roadside parking locations. Additionally, or alternatively, the pattern matching engine 155 can detect temporal patterns, for example repeated occurrences of the same or a neighbouring candidate parking location associated with a same navigation apparatus. In this respect, the pattern matching engine compares repeated occurrences of the same or neighbouring candidate parking locations with a predetermined event or occurrence value, for example 3, 4 or 5, and infers that the candidate parking location is an actual parking location in response to the actual occurrences meeting or exceeding the predetermined event or occurrence value. In another example, the pattern matching engine is arranged to identify other candidate parking locations within a predetermined distance of the candidate parking location, the other candidate parking locations arising in relation the navigation apparatus 200 and/or other navigation apparatus, and to identify any pattern associated with the respective locations of the candidate parking locations identified. The pattern is indicative of a collection of parking locations, for example a parking lot or a set or row of roadside parking locations and so the presence of the candidate parking location amongst the pattern is indicative of the candidate parking location being an actual parking location. In a further example, the analysis can comprise a combination of pattern matches, for example use of different candidate parking locations over a period of time where the different candidate parking locations are arranged in a pattern constituting a collection of parking locations. For analysis involving time, the period of time to which the log data relates can be one or more months, for example about two months or about three months.

If the analysis engine 155 fails to recognise any spatial and/or temporal patterns in a cluster or grouping of candidate parking locations, the analysis engine 155 can decide to reject (Step 454) the cluster of candidate parking locations or flag the cluster of candidate parking locations for further, for example manual, investigation, such as a site visit. Thereafter, the analysis engine 155 determines (Step 456) whether further clusters of candidate parking locations remain for pattern analysis. Of course, if a pattern is identified (Step 452), the analysis engine 155 updates the another database of candidate parking locations so as to indicate that the candidate parking locations identified relate to a collection of candidate parking locations prior to analysing any further clusters of candidate parking locations (Step 456) as mentioned above.

Figure 9:
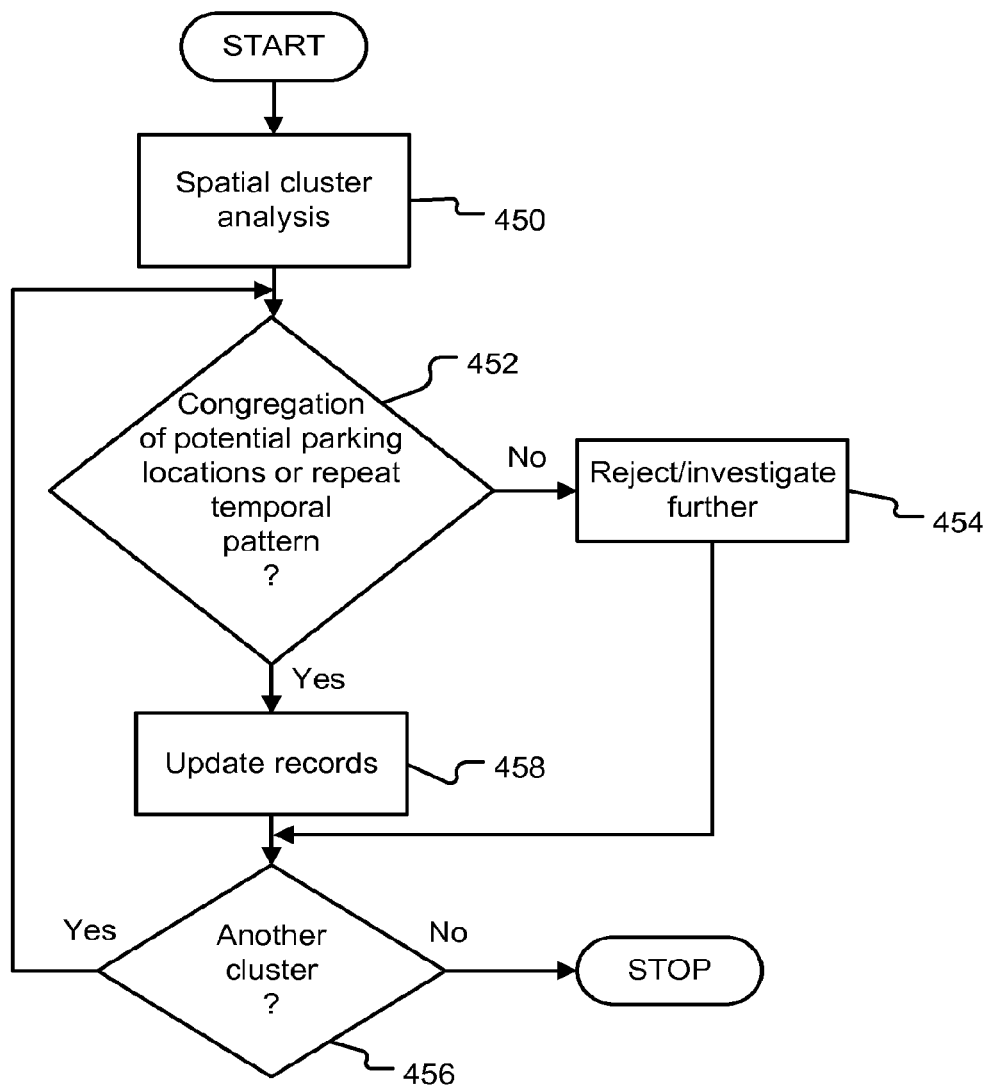
FIG. 9 is a flow diagram of a method of processing candidate parking location information constituting a fourth embodiment of the invention.

Although not shown in FIG. 9, the collections of candidate parking locations identified by the pattern matching engine are used to update the POI database 308.

Once parking locations have been identified and a database of parking locations created, a pre-existing database of parking locations is obtained, or an existing database of parking locations has been augmented by some of the above-described processing, statistical information to enrich the database of parking location in question can be generated. It should be appreciated that any database of parking locations can be in the form of a part of a database of POIs, for example the POI database 308.

In this respect, and in another embodiment, the navigation apparatus 200 (and other navigation apparatus) comprises (as already mentioned above) a data logging facility capable of recording, inter alia, location and time, for example by way of geolocation coordinates and a timestamp. In some examples, the data recorded is compressed for storage and/or transmission efficiency. The data recorded is, in this example, stored in a log file and communicated to the server 150 for processing in a manner to be described below. The data recorded constitutes a data set and it should be appreciated that the server 150 receives a plurality of sets of data to be processed.

Figure 10:
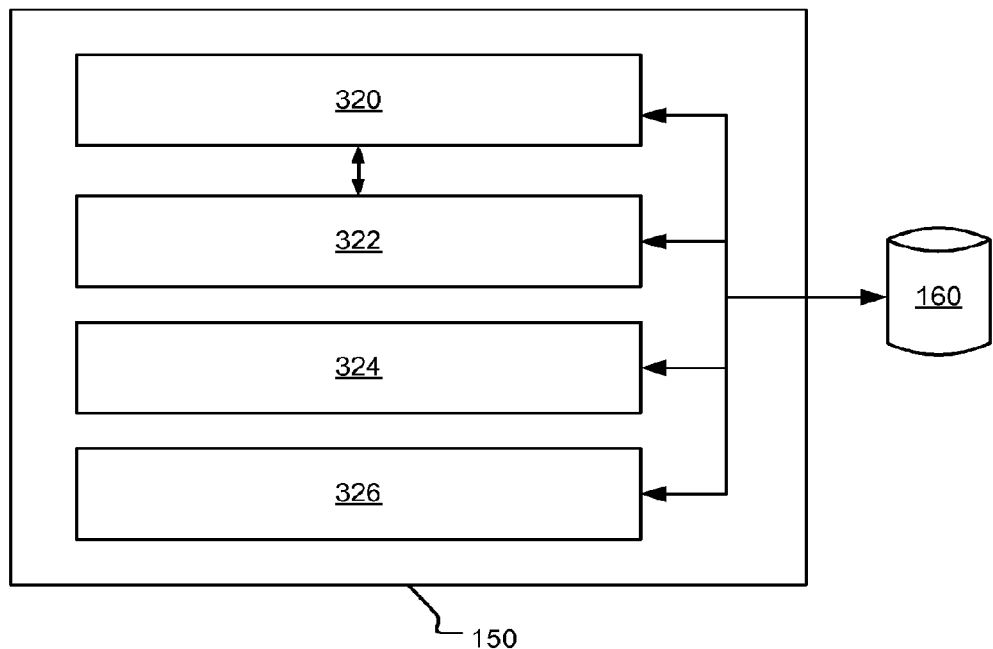
FIG. 10 is a schematic diagram of modules supported by a processing resource of a server apparatus for collection of statistical information.

In order to harvest useful information from the log files, the processing resource 154 of the server 150 supports (FIG. 10) a stay duration analyser module 320 operably capable of accessing the mass storage device 160, a data binning module 322 capable of accessing the mass storage device 160, a probability generator module 324 capable of accessing the mass storage device 160 and a parking modeller module 326 capable of accessing the mass storage device 160.

Figure 11:
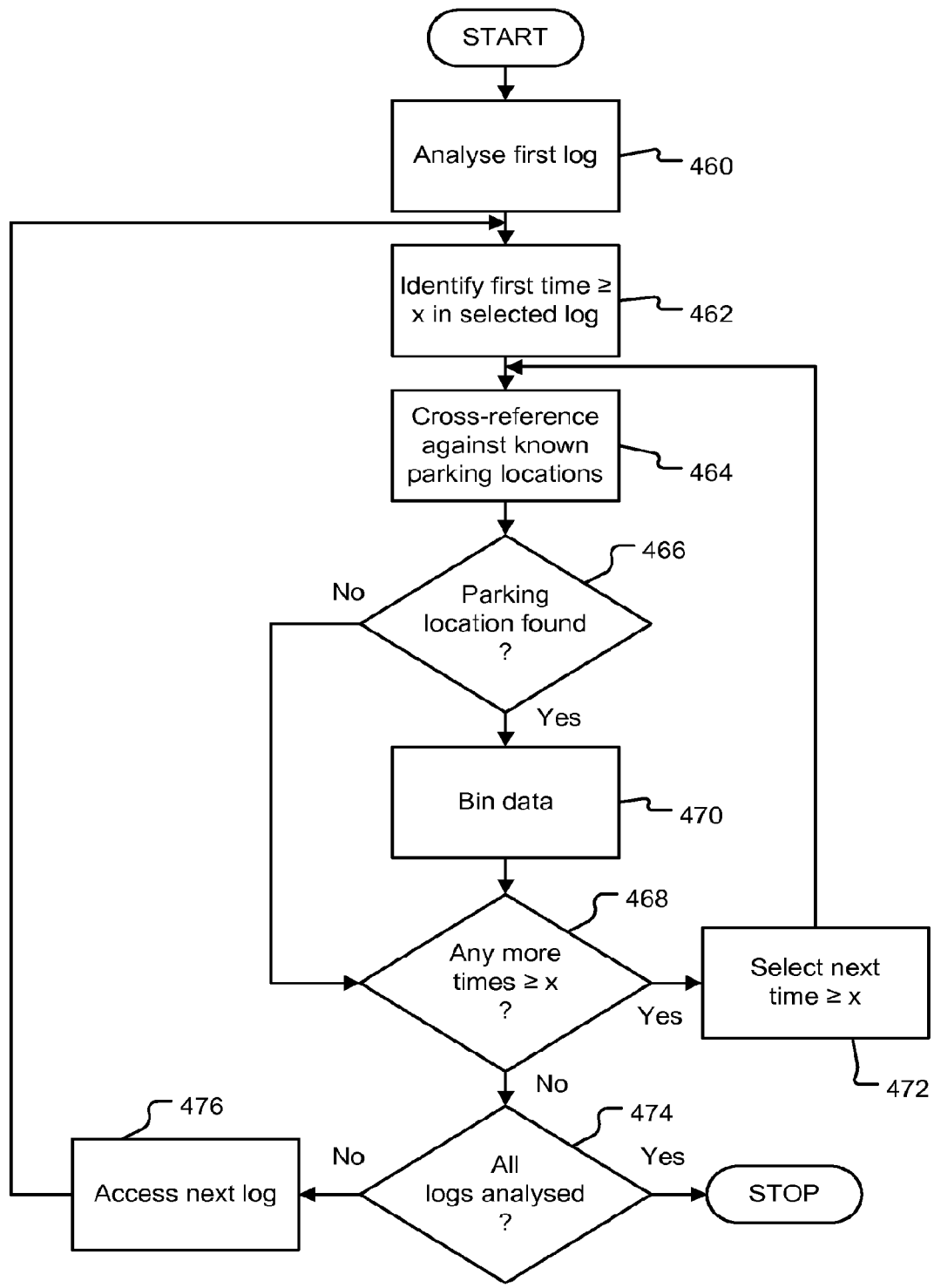
FIG. 11 is a flow diagram of a method of collecting parking duration information constituting a fifth embodiment of the invention.

Referring to FIG. 11, once processing of the log files is appropriate, for example, when a sufficient number of log files have been obtained, the stay duration analysis module 320 accesses (Step 460) a first log file for analysis. The stay duration analysis module 320 then searches (Step 462) through the temporal information in the context of the location information in order to identify a first period of time where the location information shows that the navigation apparatus associated with the log file has substantially not changed location for a predetermined period of time, x, or more. The predetermined period of time is set to reflect a duration corresponding to a minimum duration of time that constitutes a state of parking. For example, the predetermined period of time can be about 2 minutes or more, for example about 5 minutes, about 10 minutes, about 15 minutes, about 30 minutes, about 1 hour or about 2 hours. It should, however, be appreciated that the shorter the period of time selected is, the more likely that the period of time is likely to be erroneously construed or misconstrued as relating to the state of parking, i.e. false-positives may occur, as already mentioned above.

Once the first period of time, when the navigation apparatus 200 is substantially stationary, has been found, the stay duration analyser 320 queries (Step 464) the database of parking locations in order to determine (Step 466) whether the location where the navigation apparatus 200 has been stationary corresponds to a known parking location. In this respect, a location where the navigation apparatus has been stationary need not necessarily be identical to the location of the known parking location and the navigation apparatus 200 need only be located at or within a predetermined distance of the location of the known parking location in order to "qualify" as being parked at the known parking location. In the event that the location where the navigation apparatus has been substantially stationary is not present in the database of parking locations, the stay duration analyser module 320 proceeds to continue analysing the log file to identify (Step 468) another period of time when the navigation apparatus 200 has been stationary for the predetermined period of time, x, or more. However, if the location where the navigation apparatus 200 was substantially stationary is found in the database of parking locations, the first period of time is passed to the data binning module 322 in order to bin the first period of time. In this respect, the data binning module 322 is arranged to maintain counts (Step 470) of time periods received according to a plurality of time intervals. In this example, the data binning module 322 maintains a plurality of 5 minutes intervals over a 24 hour period. The data binning module 322 increments counts for each time interval that the first period of time spans. Of course, the skilled person should appreciate that more complete information can be maintained by the data binning module 322, for example in respect of 24 hour periods over different days of the week and/or days of a year. Indeed, it should be appreciated that each time interval can vary and need not be 5 minutes in duration; the duration dictates the granularity of the information held. Also, the time intervals need not be identical or substantially identical. However, for the sake of simplicity and conciseness of description, a single 24 hour period comprising 5 minute intervals is described in this example.

Once the temporal information concerning occupation of the parking location has been binned, the data binning module 322 updates the database of parking locations where, in this example, the binned temporal information concerning occupation of the parking location is stored and the stay duration analyser module 320 continues to analyse the log file, as described above, in order to identify (Step 468) another period of time where the navigation apparatus 200 has been stationary for more than or equal to the predetermined period of time, x. In the event that the another period of time is greater than or equal to the predetermined period of time, x, is found, the another period of time is selected (Step 472) and the above procedure of processing data associated with use of known parking locations is repeated (Steps 464 to 472) until no further periods of time corresponding to the navigation apparatus being stationary for more than or equal to the predetermined period of time, x, can be found.

When analysis of the first log file has been completed, the stay duration analyser module 320 then determines (Step 474) whether any other log files are stored in the mass storage device 160 that can be analysed and if other log files remain for analysis, the stay duration analyser module 320 accesses (Step 476) another log file stored by mass storage device 160 and the above-described procedure is repeated (Steps 462 to 474) in relation to the next log file accessed. Once all available log files have been analysed, the above-described analysis procedure is complete and a subsequent analysis phase can be employed in relation to the binned data.

Figure 12:
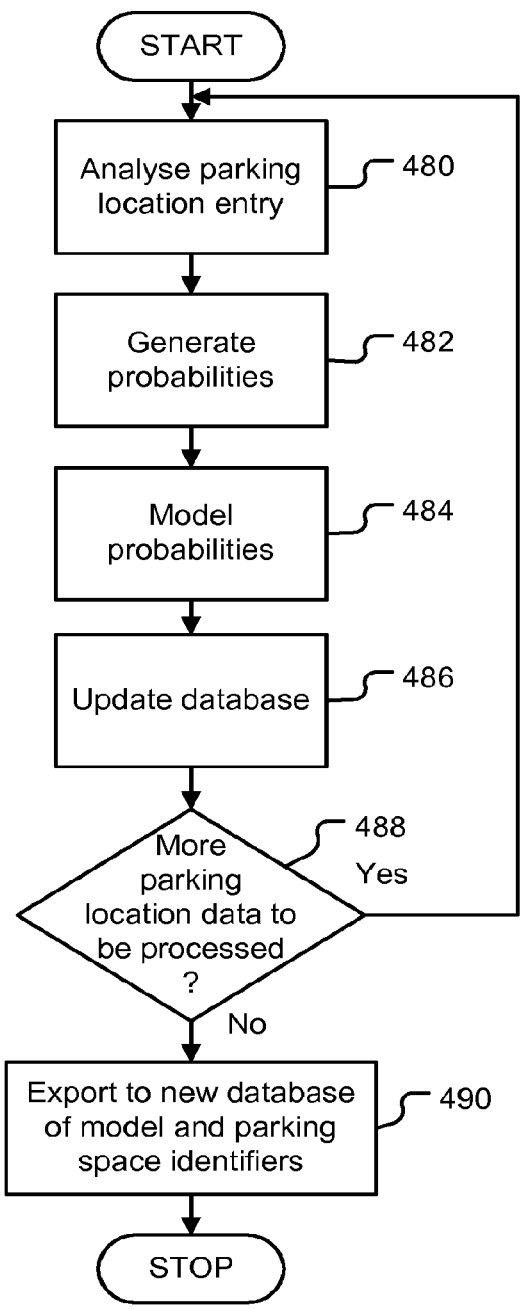
FIG. 12 is a flow diagram of a method of processing the parking duration information collected in accordance with FIG. 11.
Figure 14:
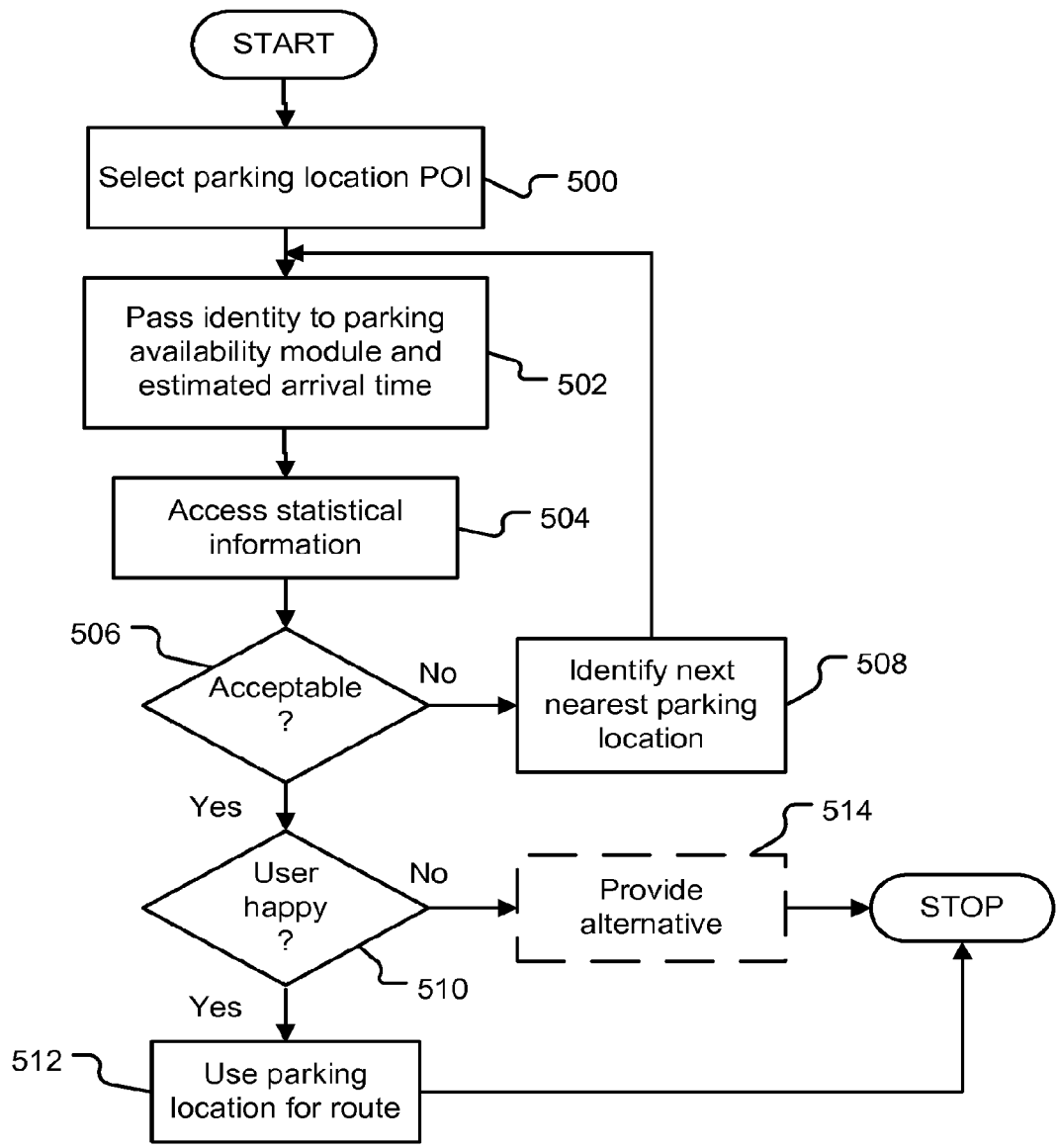
FIG. 14 is a flow diagram of a method of providing an indication of likelihood of occupancy of a parking location constituting yet another embodiment of the invention.

Turning to FIG. 12, once the temporal information has been pre-processed, the probability generator module 324 analyses (Step 480), in turn, each entry in the database of parking locations comprising identities of the parking locations and associated binned temporal information generated in the manner described above. Consequently, for a first entry of the database of parking locations, the probability generator module 324 uses the binned temporal information in order to generate (Step 482) a respective probability of the parking location being analysed being occupied during each time interval of the period, in this example 24 hours, spanned by the time intervals/bins. This can be achieved, for example, with knowledge of the number of navigation apparatus associated with the log files analysed. However, the skilled person will appreciate that other statistical techniques can be employed to generate the respective probabilities.

Thereafter, in one example, the respective probabilities need not be processed further. However, in another example, the parking modeller module 326 can be used to characterise (Step 484) the distribution of probabilities of the parking location being occupied as a function of time. The characterisation can be achieved, for example, through use of a least squares technique, an interpolation technique or any other suitable modelling technique known to the skilled person in order to fit a function to the distribution of probabilities. The interpolation technique is of particular use when it is necessary to compensate for a lack of or insufficient quantity of data points. Alternatively, a plurality of predefined probability functions or models can be provided, including for example a uniform probability function, and one of the plurality of probability functions that closest fits the distribution of probabilities associated with the parking location can be selected by the parking modeller 326. In this example, the plurality of probability functions are functions of time, namely they provide a probability of a parking location being occupied at a given time.

If desired, the selected probability function can be subjected to or have associated therewith a translation component, for example +1 hour or −1 hour (or a longer or shorter time period), for the purpose of translating the selected probability function by a desired amount of time in order to translate the probability function with respect to time so as to better fit the actual distribution of probabilities associated with the parking location.

In yet another embodiment, the probability function generated in accordance with any of the above-described techniques can be altered or incorporate a priori knowledge relating to, for example access to, or use of, the parking location. For example, use of the parking location may be illegal during certain hours of a day, such as 2 pm to 3 pm. In anther example, the parking location may be located in a secure parking lot that closes after a certain time, for example 8 pm. Hence, the parking location is inaccessible. In the above examples, a simple technique for indicating that the parking location is unavailable or unusable at such times is to set the probability of the parking location being occupied at intervals over the time period in question to 1 or another suitable value indicative of a high probability. Although modification of the probability function can take place at the probability distribution modelling level, the same methodology can be applied in relation to the generation of the distribution of probabilities described above, i.e. when the probabilities are calculated.

Once the probability distribution has been characterised by the parking modeller module 326, the characterisation, for example the probability function or an identity thereof, is stored so as to record an association between the parking location and the characterisation, such as in a relational manner. In this example, the database of parking locations is updated by updating the entry for the parking location to include the characterisation. Thereafter, the probability generator module 324 determines (Step 488) whether the database of parking locations contains any other parking location entries having associated binned temporal information that requires processing. If the database of parking locations comprises further entries that require processing, the above described process (Steps 480 to 488) is repeated until no further entries remain for processing. Thereafter, a "stripped" version of the database of parking locations is generated (Step 490), for example by way of an export function, so that a version of the database of parking locations is created absent of the probabilities generated and/or the binned temporal information. The purged version of the database also stores, in this example, the derived statistical information in a relational manner.

Hence, it can be seen from the above-described examples that statistical information is derived concerning occupation of a parking location by analysis of temporal information collected in respect of occupation of the parking location. Furthermore, this process is repeated for other parking locations in order to enrich the database of parking locations.

Whilst the above examples have described in the context of derivation of the statistical information by way of generation of probabilities for time intervals and subsequent, optional, modelling, the skilled person should appreciate that the probabilities need not be generated and the models likewise need not be generated. In such an embodiment, the binned temporal information or the like constitutes the statistical information instead of constituting an intermediate result or stage with respect to derivation of the statistical information, for example the probability function. Consequently, the statistical information is processed in response to a query from or made by a navigation apparatus in order to provide an indication of likelihood of a parking location being available.

In the above embodiments, a parking location for a single vehicle, for example an automobile, can simply be identified in the database of parking locations as an area, for example a rectangular area, constituting the parking location, or the parking location can be identified in the database of parking locations as a location of a point representative of a "centre" of the area. As such, when determining whether the navigation apparatus 200 is parked, an assessment of the location of the navigation apparatus 200 needs to take place. In this respect, and assuming the above-described temporal condition has been met, the location of the navigation apparatus 200 is deemed as being in the parking location if the location of the navigation apparatus 200 is in the area or within a predetermined distance, for example 2 meters, from the location of the point mentioned above.

As an optional refinement in respect of quality of the statistical information, the statistical information can be processed further in order that the statistical information reflects average occupancy or availability of a given parking location using any suitable known technique.

Figure 13:
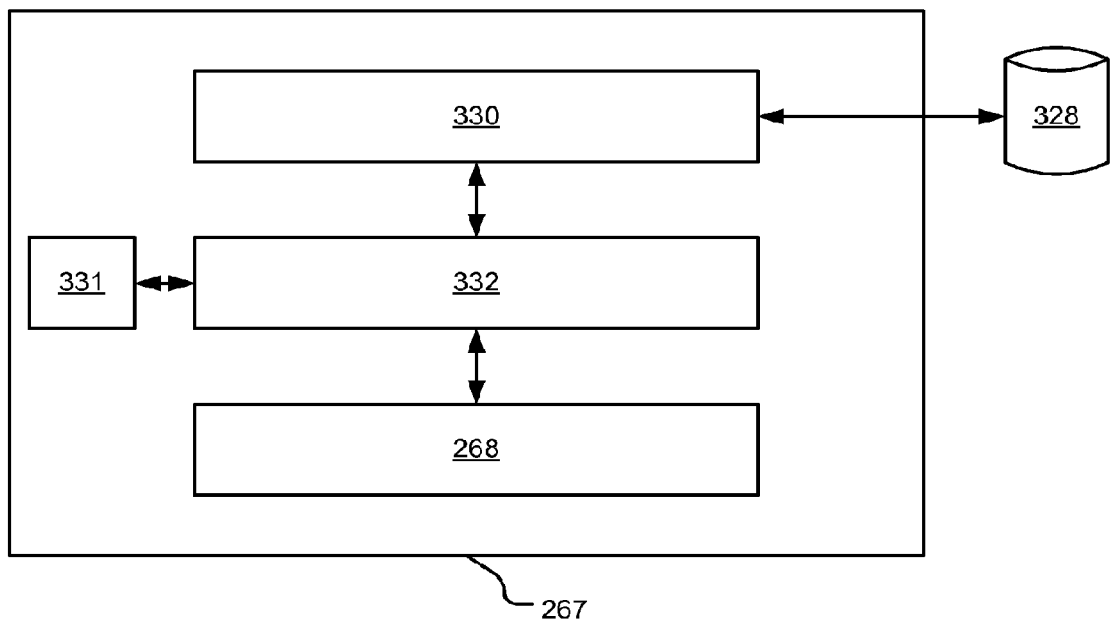
FIG. 13 is a schematic diagram of a route calculation module supported by the navigation apparatus of FIG. 3 or a server apparatus.

The availability of the statistical information associated with identities of parking locations can be used, as will be described below, in order to identify one or more parking locations for a user of the navigation apparatus 200. In this respect, the purged version of the database of parking locations is, in this example, stored locally (hereafter referred to as the "local database of parking locations") by the navigation apparatus 200 in the digital memory. Referring to FIG. 13, the route calculation module 267 of the application software 264 mentioned above comprises a destination selection module 331, a POI selection module 268, a parking availability module 330 and a route creation module 332, the parking availability module 330 being capable of accessing the local database of parking locations 328. Further details of the operation of the parking availability module 330 and the route creation module 332 in conjunction with the local database of parking locations 328 will now be described in relation to the embodiments set out below. However, the skilled person should appreciate that one or more of the above components of the application software 264 need not be employed, depending upon the requirements of a particular embodiment.

In operation, the user, a visitor to the offices of the European Patent Office in The Hague, located at Patentlaan 2, Rijswijk, requires navigation assistance to the offices of TomTom International BV located at Rembrandtplein 35, Amsterdam.

In order to implement navigation to the above destination using the navigation apparatus 200, the user configures a route for calculation as follows. Referring to FIGS. 14 to 23, the user undertakes (Step 500, FIG. 14) an illustrative destination location input process described hereinbelow using a location browser function supported by the user interface. Although not shown, the user uses a settings menu option supported by the application software 264 in order to select, in this example, view generation in a three-dimensional mode.

Figure 15:
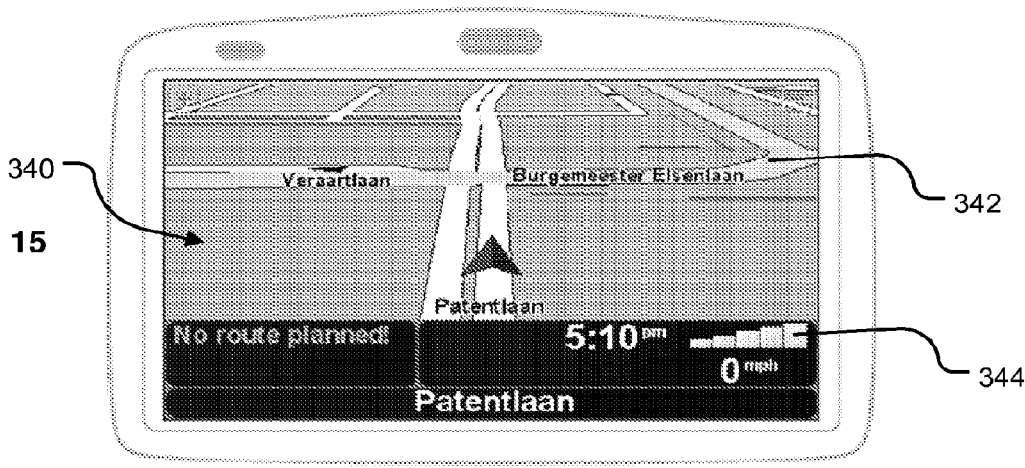
FIGS. 15 to 26 are schematic screen shots associated with operation of the navigation apparatus of FIG. 3 for selection of a parking location.

When the user powers-up the navigation apparatus 200, the apparatus 200 acquires GPS data and performs a self-location determination by calculating (in a known manner) the current location of the navigation apparatus 200. The user is then presented, as shown in FIG. 15, with a display 340 showing in pseudo three-dimensions: a local environment 342 in which the navigation apparatus 200 is determined to be located and, in a region 344 of the display 340 below the local environment 342, a set of control and status messages.

Figure 16:
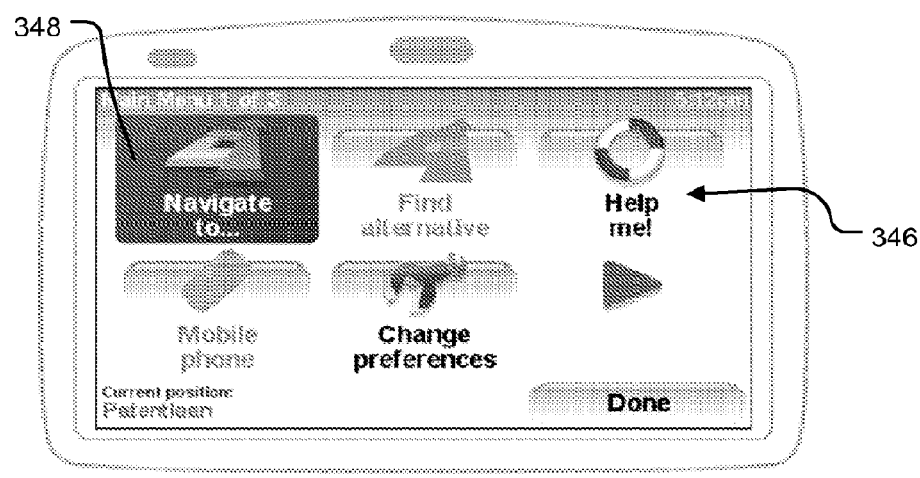

By touching the display at the local environment 342, the navigation apparatus 200, through the user interface, updates the display 300 by displaying (as shown in FIG. 16) a series of virtual or soft buttons 346 by means of which the user can, inter alia, input a destination to which the user wishes to navigate. In this example, the destination selection module 331 is used to facilitate input of a destination in relation to provision of navigation assistance and to provide an indication of the selected destination to the route creation module 332.

Figure 17:
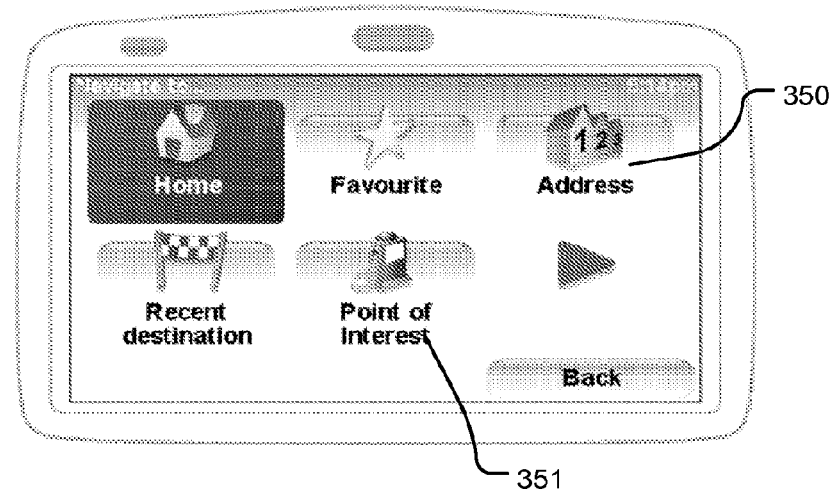

By touching the "Navigate to" virtual button 348, the navigation apparatus 200 initiates the route calculation functionality, a part of which comprises a route creation procedure implemented through the route creation module 332 mentioned above. In accordance with the route creation procedure and as supported by the destination selection module 331, the navigation apparatus 200 displays (as shown in FIG. 17) a plurality of virtual buttons that are each associated with a different category of selectable destinations. In this instance, the display shows a "home" button that if pressed would set the destination to a stored home location. The "favourite" button, if pressed, reveals a list of destinations that the user has previously stored in the navigation apparatus 200 and if one of these destinations is then selected the destination for the route to be calculated is set to the selected previously stored destination. The "recent destination" soft button, if pressed, reveals a list of selectable destinations held in the memory of the navigation apparatus 200 and to which the user has recently navigated. Selection of one of the destinations populating this list would set the destination location for this route to the selected (previously visited) location. The "point of interest" button 351, if pressed, reveals a number of options by means of which a user can opt to navigate to any of a plurality of locations, such as Parking lots (car parks), Automatic Teller Machines (ATMs), petrol stations or tourist attractions, that have been pre-stored in the navigation apparatus 200 as locations to which a user of the navigation apparatus 200 might want to navigate. A triangular "arrow" shaped virtual button provides access to additional sub-menu options relating to the "Navigate to . . . " menu option, and an "address" button 350 commences a process by which the user can input the street address of the destination to which the user wishes to navigate.

Figure 18:
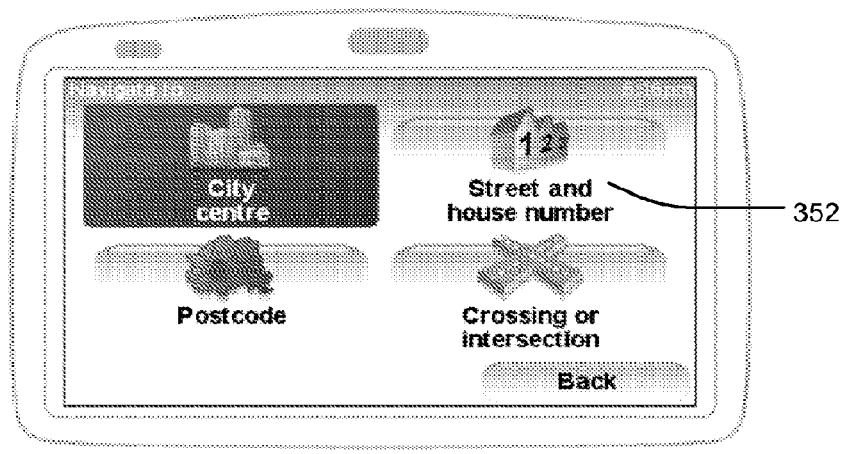

Since the user, in this example, knows the street address of the destination to which the user wishes the navigation apparatus 200 to navigate, it is assumed that the "address" button 350 is operated (by touching the button displayed on the touchscreen) in order to select a location as the destination, whereupon (as shown in FIG. 18) the user is presented with a series of address input options: address input by "city centre", by "postcode", by "crossing or intersection" (for example a junction of two roads) and by "street and house number".

Figure 19:
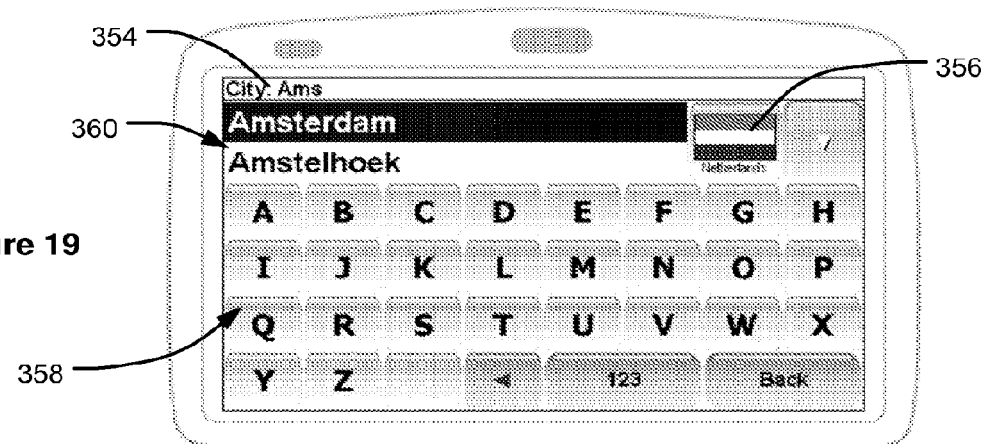

In this example, the user knows the street address and house number of the destination and hence selects a "street and house number" virtual button 352 whereupon the user is then presented, as shown in FIG. 19, with: a prompt 354 to enter the name of the city to which they wish to navigate, a flag button 356 by means of which the user can select the country in which the desired city is located, and a virtual keyboard 358 that may be operated by the user, if necessary, to input the name of the destination city. In this instance, the user begins to type the word "Amsterdam" and the navigation apparatus 200 therefore responds by providing the user with a list 360 of selectable cites.

Figure 20:
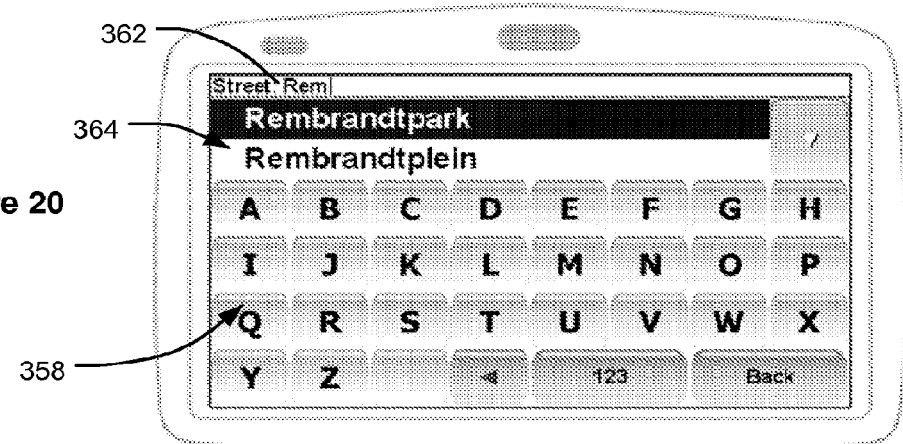
Figure 21:
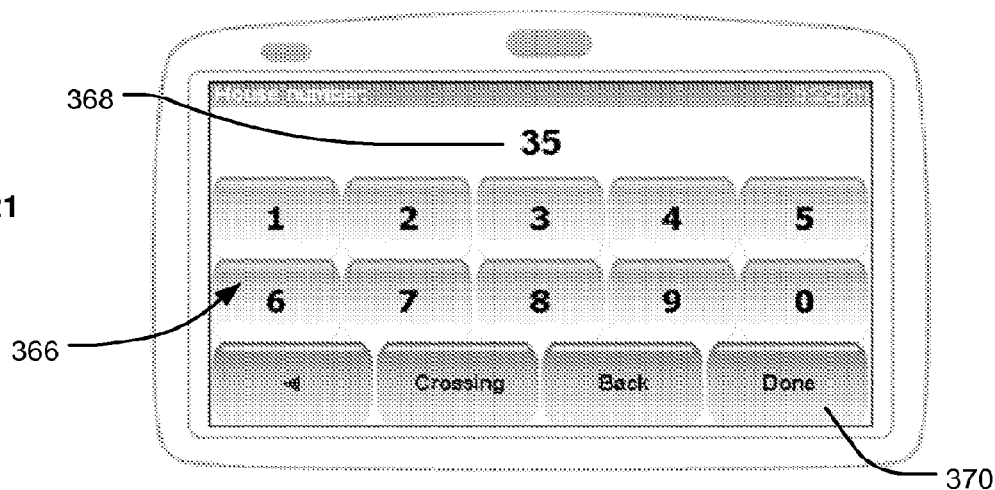
Figure 22:
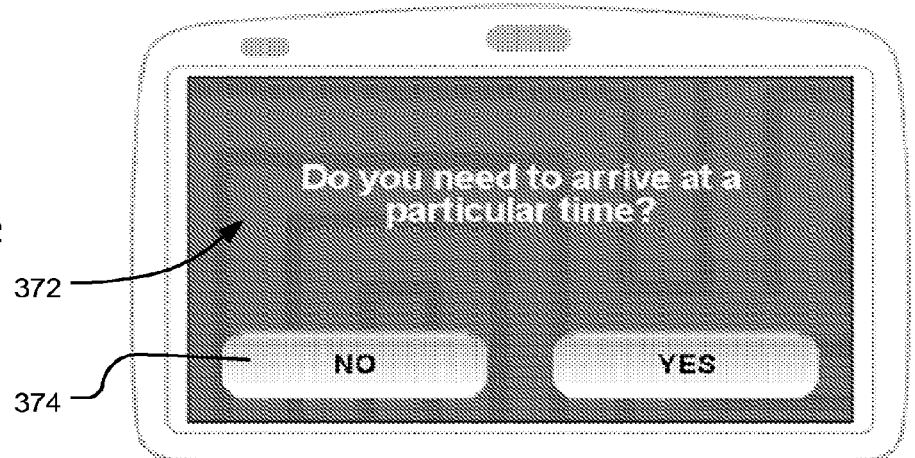
Figure 23:
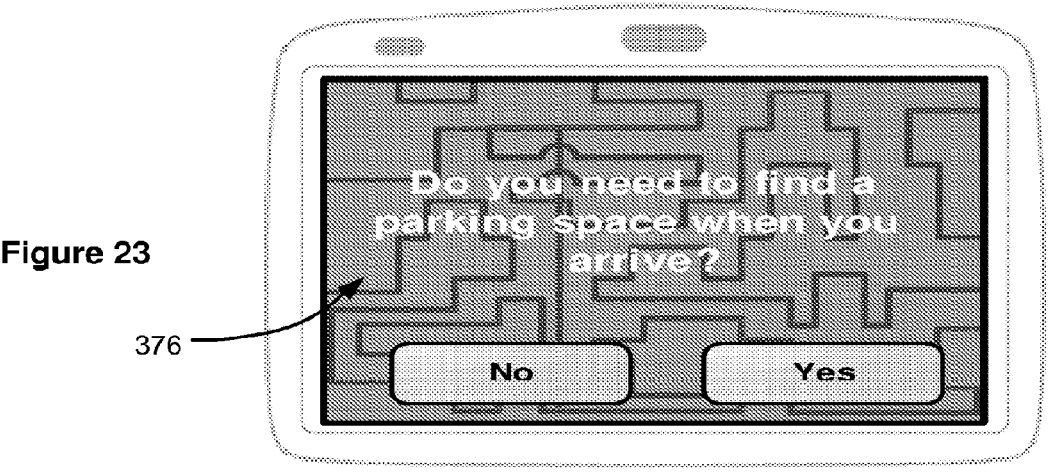

The user in this instance wishes to navigate to Amsterdam, and on selection of Amsterdam from the list 360 the navigation apparatus 200 displays, as shown in FIG. 20, the virtual keyboard 358 again by means of which the user can input street names, and a prompt 362 for entry of a street name. In this instance, the user begins to type the name of the street in which the destination is located and the navigation apparatus 200 responds by providing the user with a list 364 of selectable street names.

In this example, the user wishes to travel to the street Rembrandtplein and so the user selects "Rembrandtplein" from the displayed list 364.

Once a street has been selected, the navigation apparatus 200 then displays (FIG. 21) a restricted, largely numeric, virtual keypad 366 and prompts the user, by means of prompt 368, to enter the street number in the selected street and city to which the user wishes to navigate. If the user has previously navigated to a building number in this street, then that number is initially shown. If, as in this instance, the user wishes to navigate to No. 35, Rembrandtplein, then the user simply needs to type the street number ("35") using the virtual keypad 366 and then touch a "done" virtual button 370 displayed at the bottom right hand corner of the display 340. If the user should wish to navigate to a different building number in Rembrandtplein, then all the user need do is operate the virtual keypad 366 to input an appropriate building or street number.

In the event that the user decides that navigation to the building number suggested is required, the user touches the "Done" virtual button 370. The application software 264 then causes the user interface to present an interrogation message 372 (FIG. 22) asking the user whether a particular arrival time is required. If the user should touch a "yes" virtual button, then functionality is invoked that estimates the time required to travel to the destination (after provision by the user of the desired arrival time) and advises the user when they should leave (or if they are running late, should have left) their current location in order to arrive at their destination on time. In this instance, the user is not concerned about arriving at a particular time and hence selects a "no" virtual button 374.

Selecting the "no" virtual button 348 causes the user interface to present another interrogation message 376 (FIG. 23) asking the user whether a parking location in required upon arrival. If the user should touch a "no" virtual button, then functionality is invoked that calculates a route to the destination previously indicated. In this example, the user requires a parking place upon arrival at the destination selected.

Consequently, the route creation module 332 finds a parking location that is as close as possible to the selected destination and an estimated arrival time is calculated by the route calculation functionality mentioned above in respect of the selected parking location. The route creation module 332 then identifies (Step 502) the selected parking location to the parking availability module 330 along with the estimated arrival time calculated (or, if applicable, a user-selected desired arrival time). Thereafter, the parking availability module 330 interprets the estimated arrival time as a commencement time associated with intended occupancy of the parking location. The parking availability module 330 then accesses (Step 504) the local database of parking locations 328 in order to obtain statistical information associated with the parking location and concerning occupation of the parking location. In this example, the statistical information is a probability function p(t), for example based upon a Poisson distribution, although look-up probability data for different time intervals over a time period of, for example, a day of the type already described above can be employed.

In the case of the probability function, the parking availability module 330 applies the probability function in respect of the commencement time in order to obtain a probability of the parking location being occupied. The probability of the parking location being occupied is then passed to the route creation module 332 by the parking availability module 330 as an indication associated with likelihood of availability of the parking location. In this respect, the parking availability module 330 can provide statistical information in the form of a probability value as the indication of likelihood of availability, or the statistical information can be processed in order to provide the indication of availability in another form, for example by categorising the statistical information as will be described later herein. However, in this example, the likelihood of availability is provided as a probability value.

The route creation module 332 therefore then assesses (Step 506) the indication associated with likelihood of availability by, for example, comparing the indication with a predetermined probability threshold. In this example, if the indication exceeds or is equal to the predetermined probability threshold, such as about 0.4, the route creation module 332 deems the parking location unacceptable as a candidate destination and the route creation module 332 selects (Step 508) another parking location that is next closest to the destination selected. The another parking location can be closest temporally and/or spatially. In any event, the route calculation procedure calculates another estimated arrival time in respect of the another parking location and the above process (Steps 502 to 506) is repeated in respect of the another parking location. The above process (Steps 502 to 508) is, furthermore, repeated until an acceptable parking location is found or no further parking locations exist within a predetermined distance of the parking location.

Figure 24:
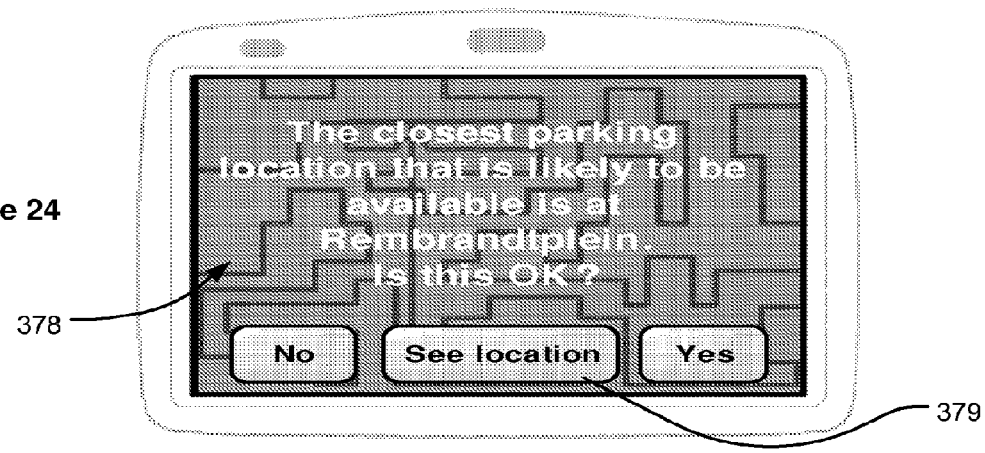

However, assuming the another parking location is acceptable, the route creation module 332, via the user interface, provides a further interrogation message 378 (FIG. 24) to ask (Step 510) the user if the another parking location is acceptable. If the user responds to confirm that the another parking location is acceptable, the route calculation procedure uses (Step 512) the location of the another parking location selected for route calculation and subsequent navigation assistance.

In the event that the user indicates disapproval of the another parking location, the above-described process can terminate or, more helpfully, the application software 264 can provide (Step 514) the user with one or more alternatives actions, for example permission to propose parking locations a greater distance from the destination initially selected or the option to modify the route selected, for example selection of a completely different destination. By way of example, if practical parking is unavailable near a post office in one town, the user can be allowed to select another post office in, for example, a closely neighbouring town where practical parking locations are possibly likely to exist. Indeed, the application software 264 can be arranged, if desired, to "look around" at neighbouring locations in such circumstances and determine if an available parking location is more likely to be found than in the current environ being searched.

Figure 25:
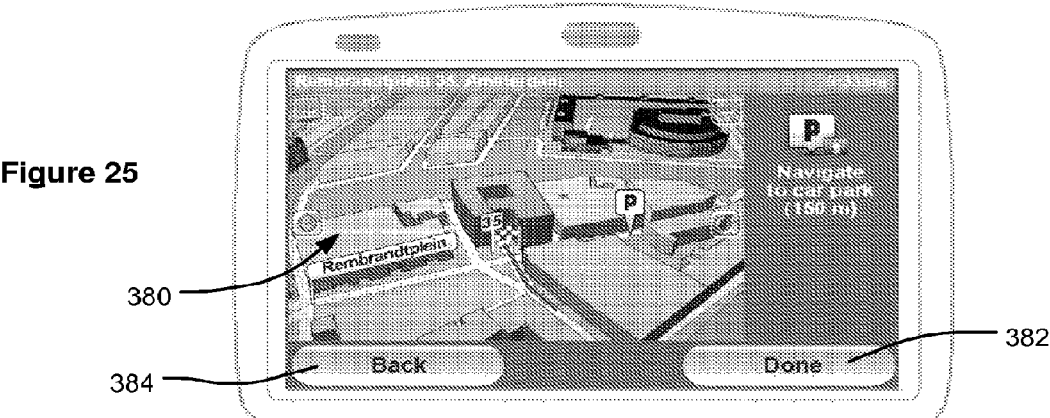

Alternatively, should the user wish to view the location of the another parking location, a "view location" virtual button 379 can be selected by the user, whereupon the application software 264 causes the user interface to provide (FIG. 25), for example, a rendered three-dimensional view 380 including, in this example, the another parking location. It should be appreciated that the view of FIG. 25 is provided for illustrative purposes to facilitate understanding and is not strictly geographically accurate. Once the user has reviewed the location of the another parking location, the another parking location can be accepted by touching a "Done" virtual button 382 or a "Back" virtual button 384 can be selected to enable the user to revert to the previous screen in order to decline (or accept) the another parking location.

Figure 26:
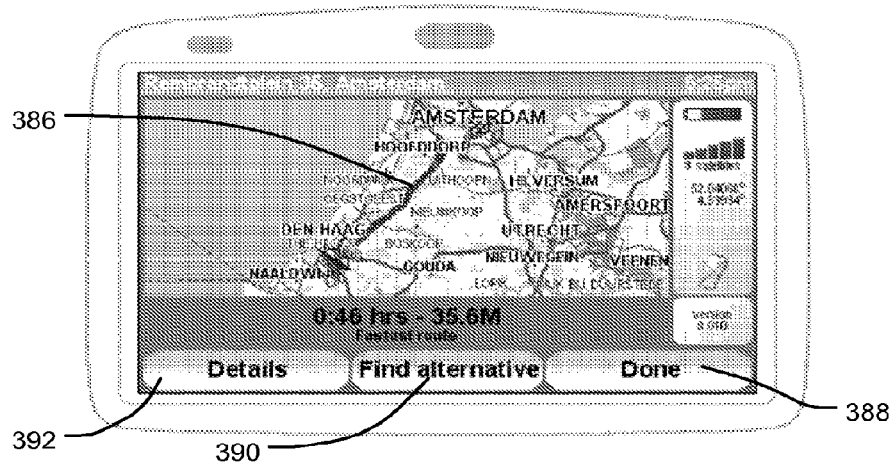

The navigation apparatus 200 then calculates a route between the current location and the selected (another) parking location and displays, via the user interface, a route 386 calculated, as shown in FIG. 26.

The user is also provided with a "done" virtual button 388 which the user can press to indicate the calculated route is acceptable, a "find alternative" virtual button 390 that the user can press to cause the navigation apparatus 200 to calculate another route to the selected destination, and a "details" virtual button 392 that a user can press to reveal selectable options for the display of more detailed information concerning the currently displayed route 386.

In this instance, it is assumed that the user considers the displayed route acceptable, and once the "done" button 388 has been pressed the user is presented, with a three-dimensional view (not shown) of the current, start, location for the navigation apparatus 200.

The user then commences their journey and the navigation apparatus 200 guides the user. The navigation apparatus 200 periodically acquires GPS data and performs a self-location determination by calculating (in a known manner) the current location of the navigation apparatus 200. Using the current location information calculated, the navigation apparatus 200, in a known manner, updates the map in accordance with determined changes in location of the navigation apparatus 200, and guides the user by providing visual and, optionally, audible navigation instructions until the destination selected is approaching or reached.

In another embodiment, where the parking location identified is one of a number of parking locations amongst a collection of parking locations, for example a parking lot, the parking availability module 330 is capable of calculating a probability of a parking location amongst the number of parking locations being available using any suitable statistical technique, the identity of the exact parking location being unimportant. Indeed, this technique can be applied to any embodiment described herein where suitable.

Figure 27:
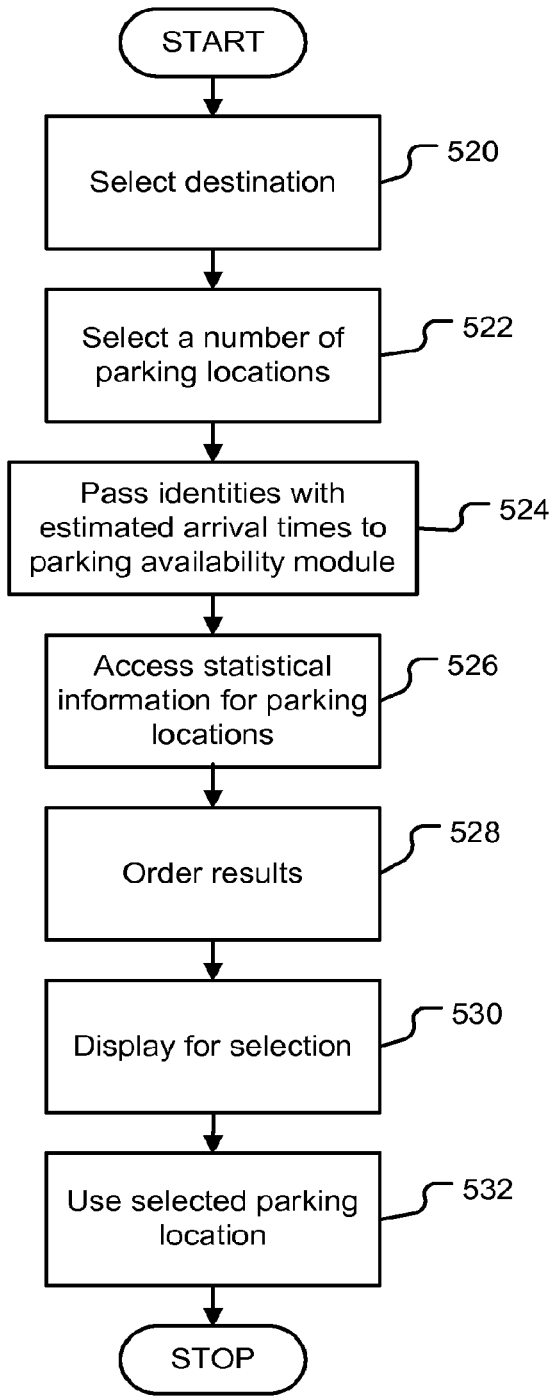
FIG. 27 is a flow diagram of another method of providing an indication of likelihood of occupancy of a parking location constituting a further embodiment of the invention.

In yet another embodiment (FIG. 27), the POI selection module 268 facilitates input of a POI by the user. The user selects a parking location using the POI selection module 268 accessible through the screen of FIG. 17. In this respect, after activating the "Point of Interest" virtual button 351, the application software 264 executes the POI selection module 268 in order to allow the user to select (Step 520) a point of interest near a desired destination. In this example, the point of interest is a parking location. For simplicity and conciseness of description, the desired destination is the destination selected above in relation to preceding examples, i.e. the offices of TomTom International BV located a Rembrandtplein 35, Amsterdam. As the technique for selection of the POI is known, for the sake of simplicity and conciseness of description, the technique will not be described in further detail herein. However, it should be appreciated that, if desired, the user can be permitted to select a desired time of arrival.

Once the user has selected (Step 520) the destination, the identity of the selected POI, for example including coordinates, is passed by the POI selection module 268 to the route creation module 332. The route creation module 332 then accesses the local database of parking locations 328 in order to identify and select (Step 522) a number of parking locations near, in this example closest, the selected destination. In this example, a predetermined distance criterion is used to limit the number of parking locations identified. The predetermined distance criterion is a distance from the destination selected. The predetermined criterion can be set by the user during route selection or pre-configured during set-up of the navigation apparatus 200.

For each parking location identified, the route creation module 332 calculates an estimated arrival time using the route calculation functionality (not shown) of the application software 264. Thereafter, the route creation module 332 identifies (Step 524) the number of parking locations selected to the parking availability module 330 along with the respective calculated estimated arrival times. The parking availability module 330 then accesses (Step 526) the local database of parking locations 328 in order to obtain information associated with each of the number of parking locations selected and concerning occupation of each of the number of parking locations. In this example, the statistical information is a probability function $P_n(t)$, where n identifies the parking location amongst the total number, t, of parking locations selected. In common with the previous embodiment, the probability functions, $P_n(t)$, are based upon a respective Poisson distribution. However, as in the case of the previous embodiment, the statistical information can be obtained from a look-up table of probability data associated with each of the parking locations or a common look-up table of probability data constituting a probability model associated with occupation of a typical parking location. Of course, as in relation to previous embodiments, the statistical data and/or the probability model can comprise an aspect of customisation for one or more of the parking locations, for example a time translation factor. The look-up table of probability data, for example in respect of different time intervals over a time period, such as a day, of the type already described above, can be employed. In the case of the probability function, the parking availability module 330 applies the respective probability function in respect of the commencement time derived from each estimated time of arrival in order to obtain a respective probability of each of the number of parking locations being occupied.

Once the statistical information has been obtained for each parking location, the parking availability module 330 orders (Step 528) the parking locations by likelihood of availability. Where the probability of two or more parking locations being available are the same or within a predetermined margin, particularly those having identical or close probabilities of being available, the parking availability module 330 can perform a secondary ordering or sorting of the number of parking locations in order to order such parking locations additionally by distance from the selected destination or by any other desired criterion, for example travel time.

Figure 28:
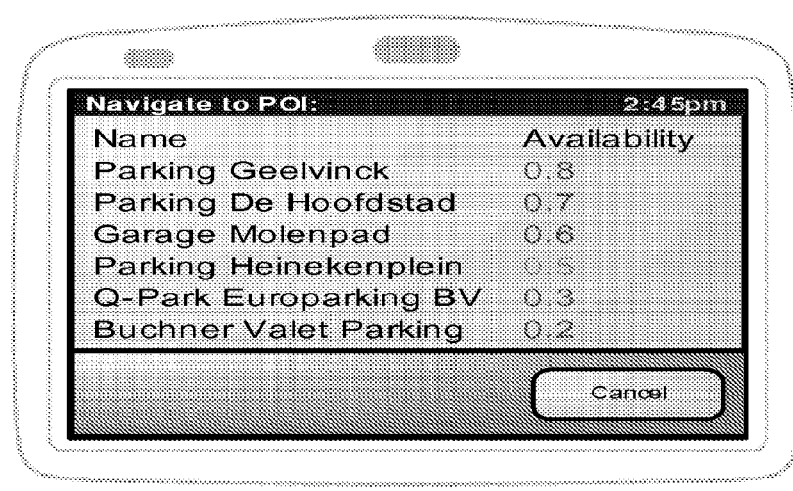
FIG. 28 is a schematic screen shot associated with operation of the navigation apparatus of FIG. 3 in relation to the method of FIG. 27.

Thereafter, the parking availability module 330 passes the ordered parking locations along with the associated respective calculated probabilities to the route creation module 332 whereupon the route creation module 332, via the user interface, displays an ordered list of parking locations (FIG. 28) identifying at least some of the number of parking locations. The user selects one of the listed parking locations and then the application software 264 continues in a like manner to that described above in relation to FIGS. 25 and 26.

In the above embodiments where the navigation apparatus 200 provides the user with an indication of availability of one or more parking locations, the statistical information employed is in relation to a specific commencement time. However, in another embodiment, the parking availability module 330 provides an indication as to likelihood of availability of one or more parking locations over a period of time, because the user can arrive early or late at a destination. In this example, a commencement period of time is used to perform a calculation of the probability of a given parking location being available if the user were to arrive at the parking location during the commencement period of time. The commencement period of time or margin is temporally centred on the estimated arrival time/commencement time. However, if desired, the temporal margin used either side of the commencement time can be replaced with different temporal margins, for example a first predetermined temporal adjustment time of 5 minutes prior to the commencement time and a second predetermined temporal adjustment time of 15 minutes after the commencement time. Any suitable known statistical technique can be employed.

In a further embodiment, any of the above embodiments that provide an indication of likelihood of availability of a parking location be it as pre-stored data or as a result of a computation, can be modified to classify or categorise the probability of a parking location being occupied according to any suitable scheme instead of using purely numerical values. Hence, statistical information concerning occupancy of the parking location can be categorised, for example by assigning a number from a range, such as between 1 and 5, or by assigning a colour, such as part of a "traffic light" scheme. The navigation apparatus 200 can provide the categorised statistical information to the server instead of, for example, a probability, thereby simplifying understanding by the user of the occupancy status of a parking location.

As a further refinement in relation to the above relevant embodiments, the application software 264, for example using the route calculation module 267, can be arranged to permit the user to select a category of parking location, for example a free parking space, a paid-for parking space, a residents-only parking space, a disabled persons-only parking space, a visitors parking space and/or a limited-stay parking space. In respect of the limited-stay parking space, if desired, the user can be permitted to specify the maximum or minimum stay duration required of a parking location. With this information, the route calculation module 267 can confine parking locations identified only to those specified by the user. Other categories and/or attributes of parking locations can similarly be specified by the user where appropriate.

Whilst the statistical information held and used in relation to the above embodiments is in relation to a single day, as suggested above, further detail can be held and used concerning the statistical information, for example statistical information for different days, months or seasons.

In the above examples, the statistical information is obtained by accessing the local database of parking locations 328. However, the skilled person should appreciate that the information can be obtained from a remote data store of a remote server, for example the data store 160 of the server 150, where the server 150 is deployed to support requests for statistical information, at least.

Indeed, it should be appreciated that whilst some of the above embodiments are described in the context of information being accessed locally with respect to the navigation apparatus 200, the skilled person should appreciate that some or all of the salient functionality can be provided remotely from the navigation apparatus 200 and the navigation apparatus 200 arranged to submit a request for information required. For example, the local database of parking locations 328 can, as suggested above, be located remotely from the navigation apparatus 200, for example at the server 150, and the processing resource 154 of the server 150 can be arranged to support the parking availability module 330 and/or at least part of the route creation module 332 necessary to identify parking locations as described above in relation to the previous embodiments associated with the use of the statistical information.

Furthermore, it should also be appreciated that the server 150 described herein is not necessarily intended to be a single server providing all functionality described above in relation to all embodiments. Instead, the skilled person should understand that one or more servers can be provided to support different functionality as required. For example, one or more servers can be provided in relation to processing of location information harvested and as described above, whereas one or more different servers can be proved in order to support, if desired, route calculation functionality for the navigation apparatus 200 and determination of likelihoods of occupation of parking locations.

In relation to use of the notions of availability and occupancy described herein, the skilled person should appreciate that operations in relation to one implies operation in relation to the other. For example, statistical information, such as a probability, p, associated with a parking location being occupied is clearly associated with statistical information, such as a probability, 1−p, of the parking location being available.

Furthermore, references herein to a parking location is intended to embrace all types of location where a vehicle can park, including without limitation, one or more spaces in a parking lot or car park, an individual parking space or a collection of parking spaces, for example a number of parking bays, such as roadside parking spaces.

Whilst embodiments described in the foregoing detailed description refer to GPS, it should be noted that the navigation apparatus may utilise any kind of position sensing technology as an alternative to (or indeed in addition to) GPS. For example the navigation apparatus may utilise using other global navigation satellite systems such as the European Galileo system. Equally, it is not limited to satellite based but could readily function using ground based beacons or any other kind of system that enables the device to determine its geographic location.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A server for enriching a database of parking location information, the server comprising:
a memory storage comprising a database comprising one or more known parking locations; and
a processing resource coupled to the memory storage, wherein the processing unit is operative to:
receive log data associated with movement for a plurality of navigation devices, the log data comprising a record of changes of locations of the navigation devices with time;
support a parking location determination module, the parking location determination module being arranged to determine from the log data candidate parking locations where a navigation device was substantially unchanged with respect to time for at least a predetermined period of time;
support a pattern matching engine to determine clusters of candidate parking locations from the log data, a cluster being a collection of candidate parking locations that are within a predetermined distance of each other; and
update the database with the candidate parking locations identified by the pattern matching engine.

2. The server of claim 1, wherein the pattern matching engine is operative to identify at least one of a spatial and temporal pattern in the clusters indicative of a collection of parking locations.

3. The server of claim 2, wherein the spatial pattern comprises a row of candidate parking locations indicative of a set of roadside parking spaces.

4. The server of claim 2, wherein the spatial pattern comprises a collection of substantially regularly arranged candidate parking locations indicative of a parking lot.

5. The server of claim 2, wherein the temporal pattern comprises a reoccurrence of a candidate parking location greater than or equal to a predetermined event value.

6. The server of claim 1, wherein the processing resource is operative to determine if any of the candidate parking locations correspond to a known parking location in the database and remove any candidate parking locations determined to be known from further analysis by the pattern matching engine.

7. The server of claim 1, wherein the database further comprises one or more locations where parking is illegal, and the parking location determination module is arranged to determine if any of the candidate parking locations correspond to a location in the database where parking is illegal, and to remove any candidate parking locations determined to be illegal from further analysis by the pattern matching engine.

8. A method of collecting parking location information, the method comprising:
analysing, by a processor, location data relating to changes in location of a plurality of navigation apparatus with time;
determining, by a processor, when a location of a navigation apparatus is substantially unchanged with respect to time for at least a predetermined period of time, wherein the determination that the location of the navigation apparatus is substantially unchanged with respect to time for at least a predetermined period of time constitutes a candidate parking location;
identifying, by a processor, instances of candidate parking locations that are within a predetermined distance of each other;
identifying, by a processor, at least one of a spatial and temporal pattern in the identified candidate parking locations indicative of a collection of parking locations; and
inferring, by a processor, that the candidate parking locations identified as being indicative of a collection of parking locations are actual parking locations.

9. The method of claim 8 further comprising clustering candidate parking locations from the location data, a cluster being a collection of candidate parking locations that are within a predetermined distance of each other.

10. The method of claim 8, wherein the inference of actual parking locations is based on pattern matching analysis.

11. The method of claim 8, wherein the spatial pattern comprises a row of candidate parking locations indicative of a set of roadside parking spaces.

12. The method of claim 8, wherein the spatial pattern comprises a collection of substantially regularly arranged candidate parking locations indicative of a parking lot.

13. The method of claim 8, wherein the temporal pattern comprises a reoccurrence of a candidate parking location greater than or equal to a predetermined event value.

14. The method of claim 8 further comprising determining if any of the candidate parking locations correspond to a known parking location and remove any candidate parking locations determined to be known.

15. The method of claim 8 further comprising determining if any of the candidate parking locations correspond to a location where parking is illegal, and to remove any candidate parking locations determined to be illegal.

16. A non-transitory computer-readable medium which stores a set of instructions which when executed performs a method of collecting parking location information, the method executed by the set of instructions comprising:
analysing location data relating to changes in location of a plurality of navigation apparatus with time;
determining when a location of a navigation apparatus is substantially unchanged with respect to time for at least a predetermined period of time, wherein the determination that the location of the navigation apparatus is substantially unchanged with respect to time for at least a predetermined period of time constitutes a candidate parking location;
identifying instances of candidate parking locations that are within a predetermined distance of each other;
identifying at least one of a spatial and temporal pattern in the identified candidate parking locations indicative of a collection of parking locations; and
inferring that the candidate parking locations identified as being indicative of a collection of parking locations are actual parking locations.

17. The computer-readable medium of claim 16 further comprising clustering candidate parking locations from the location data, a cluster being a collection of candidate parking locations that are within a predetermined distance of each other.

18. The computer-readable medium of claim 16, wherein the inference of actual parking locations is based on pattern matching analysis.

19. The computer-readable medium of claim 16 further comprising determining if any of the candidate parking locations correspond to a known parking location and remove any candidate parking locations determined to be known.

20. The computer-readable medium of claim 16 further comprising determining if any of the candidate parking locations correspond to a location where parking is illegal, and to remove any candidate parking locations determined to be illegal.

\* \* \* \* \*